US006183140B1

United States Patent

(12) Singer et al.

(10) Patent No.: US 6,183,140 B1
(45) Date of Patent: Feb. 6, 2001

(54) SYSTEM AND METHOD FOR MONITORING INTERNATIONAL TAX STATUS

(75) Inventors: Paula Singer; Gary Singer, both of Norwood, MA (US)

(73) Assignee: Windstar Technologies, Inc., Westwood, MA (US)

( * ) Notice: Under 35 U.S.C. 154(b), the term of this patent shall be extended for 0 days.

(21) Appl. No.: 08/424,875

(22) Filed: Apr. 17, 1995

(51) Int. Cl.[7] ..................... G06F 17/60
(52) U.S. Cl. ..................... 395/231
(58) Field of Search ..................... 364/401 R, 406, 364/408, 402; 395/201, 230, 231, 207

(56) References Cited

PUBLICATIONS

RIA, "IRS Official Advises Colleges and Universities on Tax Treaties", p. 7, Nov. 18, 1994.*
RIA, "Educational Institutions Employing Alien Students and Scholars" Dec. 17, 1993.*
Pirsos, "Taxing and Reporting on Aliens at Educational Institutions", Paytech, Apr. 1995.*
McDuffie, "Tax Expert Systems and Benefits From Using them", Debits & Credits pp. 16 and 54, Oct. 1992.*
McDuffie, "Tax Expert Systems and Future Developments", The CPA Journal, Jan. 1994.*
Reynolds, ":Catering for the Securities Menu", ICB Magazine v10, n11, pp. 53–55, Dec. 1994.*
Nitta, "A Knowledge and Inference System for Procedural Law", New Generation Computing, vol. 5, No. 4, 1988.*

* cited by examiner

*Primary Examiner*—Gail O. Hayes
*Assistant Examiner*—Stevie Ray Yount
(74) *Attorney, Agent, or Firm*—Maureen Stretch

(57) ABSTRACT

An interactive knowledge based system for monitoring international tax status has a residency status analyzer and a tax treaty analyzer that cooperate to determine the residency status of an individual, based on the individual's visa history, travel to and from the US, and the applicability of any treaty for the individual. The residency analyzer evaluates visa history, travel and days in the US, as well as type of activity and any applicable treaty's tie-breaker rule to determine if residency status is affected and sets indicators accordingly. The tax treaty analyzer performs an income type analysis to determine if income is from employment services, self-employment, or scholarship and fellowship grants. The tax treaty analyzer evaluates the applicable treaty for the presence and terms of a saving clause. For each type of income, the Tax treaty analyzer determines whether treaty benefits are available for the individual based on the primary activities of the person, and the person's residency status. Results are displayed interactively and also sent electronically to several output files and formats, including appropriate tax forms, files to be sent to an institution's payroll system, and audit trails.

9 Claims, 56 Drawing Sheets

*Fig. 4A-1*

| Code | Country | Treaty | Short Name |
|---|---|---|---|
| AF | Afghanistan | No | |
| AL | Albania | No | |
| AG | Algeria | No | |
| AQ | American Samoa | No | |
| AN | Andorra | No | |
| AO | Angola | No | |
| AV | Anguilla | No | |
| AY | Antartica | No | |
| AC | Antigua & Barbuda | No | |
| AR | Argentina | No | |
| AM | Armenia | Yes | |
| AA | Aruba | No | |
| AT | Ashmore & Cartier Islands | No | |
| AS | Australia | Yes | |
| AU | Austria | Yes | |
| AJ | Azerbaijan | Yes | |
| PO | Azores | No | |
| BF | Bahamas, The | No | |
| BA | Bahrain | No | |
| FQ | Baker Island | No | |
| BG | Bangladesh | No | |
| BB | Barbados | Yes | |
| BS | Bassa Da India | No | |
| BO | Belarus | Yes | |
| BE | Belgium | Yes | |
| BH | Belize | No | |
| BN | Benin | No | |
| BD | Bermuda | No | |
| BT | Bhutan | No | |
| BL | Bolivia | No | |
| BK | Bosnia-Hecegovinia | No | |
| BC | Botswana | No | |
| BV | Bouvet Island | No | |
| BR | Brazil | No | |
| IO | British Indian Ocean Territory | No | |
| BX | Brunei | No | |
| BU | Bulgaria | No | |
| UV | Burkina Faso | No | |
| BM | Burma | No | |
| BY | Burundi | No | |
| CB | Cambodia | No | |
| CM | Cameroon | No | |

*Fig. 4A-2*

| Code | Country | Treaty | Short Name |
|---|---|---|---|
| CA | Canada | Yes | |
| CV | Cape Verde | No | |
| CJ | Cayman Islands | No | |
| CT | Central African Republic | No | |
| CD | Chad | No | |
| CI | Chile | No | |
| CH | China, People's Republic of | Yes | China |
| KT | Christmas Island (Indian Ocean) | No | |
| KR | Christmas Island (Pacific Ocean) | No | |
| IP | Clipperton Island | No | |
| CK | Cocos (Keeling) Islands | No | |
| CO | Columbia | No | |
| CN | Comoros | No | |
| CF | Congo | No | |
| CW | Cook Islands | No | |
| CR | Coral Sea Islands Territory | No | |
| CS | Costa Rica | No | |
| IV | Cote D'Ivoire (Ivory Coast) | No | Ivory Coast |

*Fig. 4B-1*

| Code | Country | Treaty | Short Name |
|---|---|---|---|
| HR | Croatia | No | |
| CU | Cuba | No | |
| CY | Cypress | Yes | |
| EZ | Czech Republic | Yes | |
| DA | Denmark | Yes | |
| DJ | Djibouti | No | |
| DO | Dominica | No | |
| DR | Dominican Republic | No | |
| EC | Ecuador | No | |
| EG | Egypt | Yes | |
| ES | El Salvador | No | |
| EK | Equatorial Guinea | No | |
| ER | Eritrea | No | |
| EN | Estonia | No | |
| ET | Ethopia | No | |
| EU | Europa Island | No | |
| FA | Falkland Islands (Islas Malvinas) | No | Falklands |
| FO | Faroe Islands | No | |
| FJ | Fiji | No | |
| FI | Finland | Yes | |
| FR | France | Yes | |
| FG | French Guiana | No | |
| FP | French Polynesia | No | |
| FS | French Southern and Antarctic Lands | No | |
| GB | Gabon | No | |
| GA | Gambia, The | No | |
| GZ | Gaza Strip | No | |
| GG | Georgia | Yes | |
| GM | Germany, Democratic & Federal Republic | Yes | Germany |
| GH | Ghana | No | |
| GI | Gibraltar | No | |
| GO | Glorioso Islands | No | |
| GR | Greece | Yes | |
| GL | Greenland | No | |
| GJ | Grenada | No | |
| GP | Guadeloupe | No | |
| GQ | Guam | No | |
| GT | Guatemala | No | |
| GK | Guernsey | No | |
| GV | Guinea | No | |
| PU | Guinea-Bissau | No | |

*Fig. 4B-2*

| Code | Country | Treaty | Short Name |
|---|---|---|---|
| GY | Guyana | No | |
| HA | Haiti | No | |
| HM | Heard Island and McDonald Islands | No | |
| HO | Honduras | No | |
| HK | Hong Kong | No | |
| HQ | Howland Island | No | |
| HU | Hungary | Yes | |
| IC | Iceland | Yes | |
| IN | India | Yes | |
| ID | Indonesia | Yes | |
| IR | Iran | No | |
| IZ | Iraq | No | |
| IY | Iraq-Saudi Arabia Neutral Zone | No | |
| EI | Ireland | Yes | |
| IM | Isle of Man | No | |
| IS | Israel | Yes | |
| IT | Italy | Yes | |
| IV | Ivory Coast | No | |
| JM | Jamaica | Yes | |

*Fig. 4C-1*

| Code | Country | Treaty | Short Name |
|---|---|---|---|
| JN | Jan Mayen | No | |
| JA | Japan | Yes | |
| JE | Jersey | No | |
| JQ | Johnston Atoll | No | |
| JO | Jordan | No | |
| JU | Juan De Nova Island | No | |
| KZ | Kazakhstan | No | |
| KE | Kenya | No | |
| KQ | Kingman Reef | No | |
| KR | Kiribati | No | |
| KN | Korea, Democratic People's Republic of (North) | No | North Korea |
| KS | Korea, Republic of (South) | Yes | South Korea |
| KU | Kuwait | No | |
| KG | Kyrgyzstan | Yes | |
| LA | Laos | No | |
| LG | Latvia | No | |
| LE | Lebanon | No | |
| LT | Lesotho | No | |
| LI | Liberia | No | |
| LY | Libya | No | |
| LS | Liechtenstein | No | |
| LH | Lithuania | No | |
| LU | Luxembourg | Yes | |
| MK | Macadonia | No | |
| MC | Macua | No | |
| MA | Madagascar | No | |
| MI | Malawi | No | |
| MY | Malayasia | No | |
| MV | Maldives | No | |
| ML | Mali | No | |
| MT | Malta | Yes | |
| RM | Marshall Islands | No | |
| MB | Martinique | No | |
| MR | Mauritania | No | |
| MP | Mauritius | No | |
| MF | Mayotte | No | |
| MX | Mexico | Yes | |
| FM | Micronesia, Federated States of | No | Micronesia |
| MQ | Midway Islands | No | |
| MD | Moldova | Yes | |
| MN | Monaco | No | |

*Fig. 4C-2*

| Code | Country | Treaty | Short Name |
|---|---|---|---|
| MG | Mongolia | No | |
| MW | Montenegro | No | |
| MH | Montserrat | No | |
| MO | Morocco | Yes | |
| MZ | Mozambique | No | |
| WA | Namibia | No | |
| NR | Naura | No | |
| BQ | Navassa Island | No | |
| NP | Nepal | No | |
| NL | Netherlands | Yes | |
| NA | Netherlands Antilles | No | |
| NC | New Caledonia | No | |
| NZ | New Zealand | Yes | |
| NU | Nicaragua | No | |
| NG | Niger | No | |
| NI | Nigeria | No | |
| NE | Niue | No | |
| NF | Norfolk Island | No | |
| CQ | Northern Mariana Islands | No | |

Fig. 4D-1

| Code | Country | Treaty | Short Name |
|---|---|---|---|
| NO | Norway | Yes | |
| MU | Oman | No | |
| OC | Other Countries | No | |
| PK | Pakistan | Yes | |
| LQ | Palmyra Atoll | No | |
| PM | Panama | No | |
| PP | Papua New Guinea | No | |
| PF | Paracel Islands | No | |
| PA | Paraguay | No | |
| PE | Peru | No | |
| RP | Philippines | Yes | |
| PC | Pitcairn Island | No | |
| PL | Poland | Yes | |
| PO | Portugal | No | |
| RQ | Puerto Rico | No | |
| QA | Qatar | No | |
| RE | Reunion | No | |
| RO | Romania | Yes | |
| RS | Russia | Yes | |
| RW | Rwanda | No | |
| SM | San Marino | No | |
| TP | Sao Tome and Principe | No | |
| SA | Saudi Arabia | No | |
| SG | Senegal | No | |
| SR | Serbia | No | |
| SE | Seychelles | No | |
| SL | Sierra Leone | No | |
| SN | Singapore | No | |
| LO | Slovak Republic | Yes | |
| SI | Slovenia | No | |
| BP | Solomon Islands | No | |
| SO | Somalia | No | |
| SF | South Africa | No | |
| SP | Spain | Yes | |
| PG | Spartly Islands | No | |
| CE | Sri Lanka | No | |
| ST | St Lucia | No | |
| VC | St Vincent and the Grenadines | No | |
| SH | St Helena | No | |
| SC | St Kitts and Nevis | No | |
| SB | St Pierre and Miquelon | No | |

*Fig. 4D-2*

| Code | Country | Treaty | Short Name |
|---|---|---|---|
| SU | Sudan | No | |
| NS | Suriname | No | |
| SV | Svalbard | No | |
| WZ | Swaziland | No | |
| SW | Sweden | Yes | |
| SZ | Switzerland | Yes | |
| SY | Syria | No | |
| TW | Taiwan | No | |
| TI | Tajikistan | Yes | |
| TZ | Tanzania, United Republic of | No | Tanzania |
| TH | Thailand | No | |
| TO | Togo | No | |
| TL | Tokelalu | No | |
| TN | Tonga | No | |
| TD | Trinidad and Tobago | Yes | |
| TE | Tromelin Island | No | |
| PS | Trust Territory of the Pacific Islands | No | |
| TS | Tunisia | Yes | |
| TU | Turkey | No | |

*Fig. 4E*

| Code | Country | Treaty | Short Name |
|---|---|---|---|
| TX | Turkmenistan | Yes | |
| TK | Turks and Caicos Islands | No | |
| TV | Tuvalu | No | |
| UG | Uganda | No | |
| UP | Ukraine | Yes | |
| TC | United Arab Emirates | No | |
| UK | United Kingdom | Yes | |
| UY | Uruguay | No | |
| UZ | Uzbekistan | Yes | |
| NH | Vanuatu | No | |
| VT | Vatican City | No | |
| VE | Venezuela | NO | |
| VM | Vietnam | No | |
| VI | Virgin Islands (British) | No | |
| VQ | Virgin Islands (U.S.) | No | |
| WQ | Wake Island | No | |
| WF | Wallis and Futuna | No | |
| WE | West Bank | No | |
| WI | Western Sahara | No | |
| WS | Western Samoa | No | |
| YM | Yemen | No | |
| YO | Yugoslavia | No | |
| CG | Zaire | No | |
| ZA | Zambia | No | |
| ZI | Zimbabwe | No | |

114

Program:
Reread File for Individual Visas Categorize as follows:
Situation 1 Start Date and End Date in Same Calendar Year
Calculate gross days difference: End Date – Start Date + 1
Call Exempt Analysis Routines
Call Combine Visas Routines
Create (or update) one record for this Visa type and Calendar Year
Create (or update) one summary record for this Calendar Year
Create (or update) one record for this Primary Activity and Calendar Year

116

Situation 2 Start Date in one Year, End Date in Next Contiguous Year
Start Calendar Year:
Calculate gross days difference: 12/31/yy – Start Date + 1 Call Exempt Analysis Routines
Call Combine Visas Routines
Create (or update) one summary record for this Visa type and Calendar Year
Create (or update) one summary record for this Calendar Year
Create (or update) one record for this Primary Activity and Calendar Year
For End Calendar Year:
Calculate gross days difference: End Date – 01/01/yy + 1
Call Exempt Analysis Routines
Call Combine Visas Routines
Create (or update) one summary record for this Visa type and Calendar Year
Create (or update) one summary record for this Calendar Year
Create (or update) one record for this Primary Activity and Calendar Year

118

Situation 3 Start Date in one Year, Intervening Year(s), End Date later Year
For Start Calendar Year:
Calculate gross days difference: 12/31/yy – Start Date + 1 Call Exempt Analysis Routines
Call Combine Visas Routines
Create (or update) one summary record for this Visa type and Calendar Year
Create (or update) one summary record for this Calendar Year
Create (or update) one record for this Primary Activity and Calendar Year
For Each Intervening Year:
Calculate gross days difference: 12/31/yy – 01/01/yy +1
Call Exempt Analysis Routines
Do Not Call Combine Visas Routines
Create one summary record for this Visa Type and Calendar Year
Create one summary record for this Calendar Year
Create one record for this Primary Activity and Calendar Year
For End Calendar Year:
Calculate gross days difference: End Date – 01/01/yy + 1
Call Exempt Analysis Routines
Call Combine Visas Routines
Create (or update) one summary record for this Visa type and Calendar Year
Create (or update) one summary record for this Calendar Year
Create (or update) one record for this Primary Activity and Calendar Year
Allow the user to input any days out of the USA. Net days out of total.
Update both the V Visa Type–Year record and the Year Only Summary record.

Exempt Days Analysis

| | |
|---|---|
| For Visas that begin with "A" or "G" | Days are always exempt |
| "F" "M" "J" "Q" Student | Days are exempt for 5 years only over lifetime |
| "J" Non Student & For Not Foreign Funded Visits: | |
| "Q" Non Student after 10/1/94 | Days are exempt for max 2 prior 6 years with roll off (Includes student exempt days) |
| For Foreign Funded Visits: | Days are exempt for max 4 of prior 6 years with roll off (Includes student exempt days) |
| all the rest | Days are never exempt |

Combining Routines

Avoid Creating a new Visa Type - Calendar Year Record as follows:

Combine any "F", "M", "J" and "Q" Student days with each other in the same year

Combine any "J" Non Student with any "Q" Non Student after 10/1/94

Combine any "A" and "G" days with each other in the same year

Combine "LPR" days only with "LPR"

Combine any visa if neither the existing Visa Type Record of the comparing record is any of the above Visa Types

| Code | Country | PRTR | EDATE | TDATE | RES | RES# | TB | FICA | ART# | EXCPT | EXC# | LPR | USCT |
|---|---|---|---|---|---|---|---|---|---|---|---|---|---|
| AM | Armenia | No | 1976 | | Yes | 11 | No | Yes | | No | | No | No |
| AS | Australia | No | 1983 | | Yes | 4 | Yes | No | | Yes | 1(4) | Yes | Yes |
| AU | Austria | No | 1957 | | No | | No | No | | Yes | XV[3] | No | Yes |
| AJ | Azerbaijan | No | 1976 | | Yes | 11 | No | Yes | | No | | No | No |
| BB | Barbados | No | 1984 | | Yes | 4 | Yes | No | | Yes | 1(4) | Yes | Yes |
| BO | Belarus | No | 1976 | | Yes | 11 | No | Yes | | No | | No | No |
| BE | Belgium | No | 1971 | | Yes | 4 | Yes | No | | Yes | 23(2) | Yes | Yes |
| CA | Canada | No | 1985 | | Yes | IV | Yes | No | | Yes | XXIX(3) | Yes | Yes |
| CH | China | No | 1987 | | Yes | 4 | Yes | No | | Yes | P2 | No | Yes |
| CY | Cyprus | No | 1986 | | Yes | 3 | Yes | No | | Yes | 4(4) | Yes | Yes |
| EZ | Czech Republic | No | 1993 | | Yes | 4 | Yes | No | | Yes | 1(4) | Yes | Yes |
| DA | Denmark | No | 1948 | | No | | No | No | | No | | No | No |
| EG | Egypt | No | 1982 | | Yes | 3 | Yes | No | | Yes | 6(4) | Yes | Yes |
| FI | Finland | No | 1991 | | Yes | 4 | Yes | No | | Yes | 1(4) | Yes | Yes |
| FR | France | No | 1967 | | Yes | 3 | Yes | No | | Yes | 22(4) | Yes | Yes |
| GG | Georgia | No | 1976 | | Yes | 11 | No | Yes | | No | | No | No |
| GM | Germany | No | 1990 | | Yes | 4 | Yes | Yes | | Yes | P1 | Yes | Yes |
| GR | Greece | No | 1953 | | No | | No | No | | No | | No | No |
| HU | Hungary | No | 1980 | | Yes | 4 | Yes | No | | Yes | 1(3) | Yes | Yes |
| IC | Iceland | No | 1976 | | Yes | 3 | Yes | No | | Yes | 4(4) | Yes | Yes |
| In | India | No | 1991 | | Yes | 4 | Yes | No | | Yes | 1(4) | Yes | Yes |
| IN | Indonesia | No | 1990 | | Yes | 4 | Yes | No | | Yes | 28(4) | Yes | Yes |
| EI | Ireland | No | 1951 | | Yes | II(g)&(h) | No | No | | No | | No | No |
| IS | Israel | No | 1995 | | Yes | 3 | Yes | No | | Yes | 6(4) | Yes | Yes |
| IT | Italy | No | 1986 | | Yes | 4 | Yes | No | | Yes | 1(3) | Yes | Yes |
| JM | Jamaica | No | 1982 | | Yes | 4 | Yes | No | | Yes | 1(4) | Yes | Yes |
| JA | Japan | No | 1973 | | Yes | 3 | Yes | No | | Yes | 4(4) | Yes | Yes |
| KZ | Kazakhstan | No | 1976 | 1994 | Yes | 11 | No | Yes | | No | | No | No |
| KS | Korea | No | 1980 | | Yes | 3 | Yes | No | | Yes | 4(5) | Yes | Yes |
| KG | Kyrgyzstan | No | 1976 | | Yes | 11(h) | No | Yes | | No | | No | No |
| LU | Luxembourg | No | 1964 | | Yes | 11 | No | No | | No | | No | No |
| MT | Malta | No | 1982 | | Yes | 4 | Yes | No | | Yes | 1(4) | Yes | Yes |
| MX | Mexico | No | 1994 | | Yes | 4 | Yes | No | | Yes | 1(4) | Yes | Yes |
| MD | Moldova | No | 1976 | | Yes | 11 | No | Yes | | No | | No | No |
| MO | Morocco | No | 1981 | | Yes | 3 | Yes | No | | Yes | 20(4) | Yes | Yes |
| NL | Netherlands | Yes | 1994 | | Yes | 4 | Yes | No | | Yes | 24(2) | Yes | Yes |
| NL | Netherlands (old) | No | 1965 | 1993 | No | | No | No | | No | | No | No |
| NZ | New Zealand | No | 1984 | | Yes | 4 | Yes | No | | Yes | 1(4) | Yes | Yes |
| NO | Norway | No | 1971 | | Yes | 3 | Yes | No | | Yes | 22(4) | Yes | Yes |
| PK | Pakistan | No | 1959 | | Yes | 11(h)&(i | No | No | | No | | No | No |

*Fig. 6A-2*

| Code | Country | PRTR | EDATE | TDATE | RES | RES# | TB | FICA | ART# | EXCPT | EXC# | LPR | USCT |
|---|---|---|---|---|---|---|---|---|---|---|---|---|---|
| RP | Philippines | No | 1983 | | Yes | 3 | Yes | No | | Yes | 6(4) | Yes | Yes |
| PL | Poland | No | 1974 | | Yes | 3 | Yes | No | | Yes | 5(4) | Yes | Yes |
| RO | Romania | No | 1974 | | Yes | 3 | Yes | No | | Yes | 4(4) | Yes | Yes |
| RS | Russia | Yes | 1994 | | Yes | 4 | Yes | No | | Yes | 1(4) | Yes | Yes |
| RS | Russia (old) | No | 1976 | 1993 | Yes | 11 | No | Yes | | No | | No | No |
| LO | Slovak Republic | No | 1993 | | Yes | 4 | Yes | No | | Yes | 1(4) | Yes | Yes |
| SP | Spain | No | 1991 | | Yes | 4 | Yes | No | | Yes | 1(4) | Yes | Yes |
| SW | Sweden | No | 1940 | | No | | No | No | | No | | No | No |
| SZ | Switzerland | No | 1951 | | No | | No | No | | No | | No | No |
| TI | Tajikistan | No | 1976 | | Yes | 11 | No | Yes | | No | | No | No |
| TD | Trinidad and Tabag | No | 1970 | | Yes | 2 | No | No | | Yes | 3(4) | Yes | Yes |
| TS | Tunisia | No | 1990 | | Yes | 4 | Yes | No | | Yes | 22(3) | Yes | Yes |
| TX | Turkmenistan | No | 1976 | | Yes | 11 | No | Yes | | No | | No | No |
| UP | Ukraine | No | 1976 | | Yes | 11 | No | Yes | | No | | No | No |
| UK | United Kingdom | No | 1975 | | Yes | 4 | Yes | No | | Yes | 1(4) | Yes | Yes |
| UZ | Uzbekistan | No | 1976 | | Yes | 11 | No | Yes | | No | | No | No |

*Fig. 6B-1*

| Code | Country | TR-BN | TR# | TRUS | ACC | ED + | INST | RSH | TRES | P-RES | YRS | TYPE | ONCE |
|---|---|---|---|---|---|---|---|---|---|---|---|---|---|
| AM | Armenia | Yes | VI(1) | Yes | No | Yes | 100 | Yes | Yes | Yes | 2 | 7 | No |
| AS | Australia | No | | No | No | No | | No | No | No | | | No |
| AU | Austria | Yes | XII | Yes | No | No | | No | Yes | Yes | 2 | 1 | No |
| AJ | Azerbaijan | Yes | VI(1) | Yes | No | Yes | 100 | Yes | Yes | Yes | 2 | 7 | No |
| BB | Barbados | No | | No | No | No | | No | No | No | | | No |
| BO | Belarus | Yes | VI | Yes | No | Yes | 100 | Yes | Yes | Yes | 2 | 7 | No |
| BE | Belgium | Yes | 20 | Yes | Yes | No | | Yes | No | No | 2 | 3 | No |
| CA | Canada | No | | No | No | No | | No | No | No | | | No |
| CH | China | Yes | 19 | Yes | Yes | Yes | 2 | Yes | No | Yes | 3 | 4 | No |
| CY | Cyprus | No | | No | No | No | | No | No | No | | | No |
| EZ | Czech Republic | Yes | 21 | Yes | Yes | Yes | 3 | Yes | No | Yes | 2 | | Yes |
| DA | Denmark | Yes | XIV | Yes | Yes | No | | No | Yes | Yes | 2 | 1 | No |
| EG | Egypt | Yes | 22 | Yes | Yes | No | | Yes | No | Yes | 2 | 2 | No |
| FI | Finland | No | | No | No | No | | No | No | No | | | No |
| FR | France | Yes | 17 | Yes | Yes | No | | Yes | No | Yes | 2 | 2 | No |
| GG | Georgia | Yes | VI(1) | Yes | No | Yes | 100 | Yes | Yes | Yes | 2 | 7 | No |
| GM | Germany | Yes | 20 | Yes | Yes | Yes | 101 | Yes | No | Yes | 2 | 6 | No |
| GR | Greece | Yes | XII | Yes | No | No | | No | Yes | Yes | 3 | 1 | No |
| HU | Hungary | Yes | 17 | Yes | Yes | No | | Yes | No | Yes | 2 | 2 | No |
| IC | Iceland | Yes | 21 | Yes | Yes | No | | Yes | No | No | 2 | 2 | No |
| IN | India | Yes | 22 | Yes | Yes | No | | Yes | No | Yes | 2 | 6 | No |
| ID | Indonesia | Yes | 20 | Yes | No | No | | Yes | No | Yes | 2 | 2 | Yes |
| EI | Ireland | Yes | XVIII | Yes | No | No | | No | Yes | Yes | 2 | 1 | No |
| IS | Isreal | Yes | 23 | Yes | Yes | No | | Yes | No | No | 2 | 2 | No |
| IT | Italy | Yes | 20 | Yes | No | Yes | 6 | Yes | No | Yes | 2 | 1 | No |
| JA | Jamaica | Yes | 22 | Yes | Yes | No | | Yes | No | Yes | 2 | 2 | Yes |
| JA | Japan | Yes | 19 | Yes | Yes | No | | Yes | No | No | 2 | 4 | No |
| KZ | Kazakhstan | Yes | VI(1) | Yes | No | Yes | 100 | Yes | Yes | Yes | 2 | 7 | No |
| KS | Korea | Yes | 20 | Yes | Yes | No | | Yes | No | No | 2 | 4 | No |
| KG | Kyrgyzstan | Yes | VI(1) | Yes | No | Yes | 100 | Yes | Yes | Yes | 2 | 7 | No |
| LU | Luxembourg | Yes | XIII | Yes | Yes | No | | Yes | Yes | Yes | 2 | 1 | No |
| MT | Malta | Yes | 21 | No | No | No | | Yes | No | No | 2 | 6 | No |
| MX | Mexico | No | | No | No | No | | No | No | No | | | No |
| MD | Moldova | Yes | VI(1) | Yes | No | Yes | 100 | Yes | Yes | Yes | 2 | 7 | No |
| MO | Morocco | No | | No | No | No | | No | No | No | | | No |
| NL | Netherlands | Yes | 21 | Yes | Yes | No | | Yes | No | Yes | 2 | 6 | No |
| NL | Netherlands (old) | No | XVII | No | Yes | No | | Yes | No | Yes | 2 | 3 | No |
| NZ | New Zealand | No | | No | No | No | | No | No | No | | | No |
| NO | Norway | Yes | 15 | Yes | Yes | No | | Yes | No | Yes | 2 | 2 | No |
| PK | Pakistan | Yes | XII | Yes | No | No | | No | Yes | Yes | 2 | 1 | No |

*Fig. 6B-2*

| Code | Country | TR-BN | TR# | TRUS | ACC | ES + | INST | RSH | TRES | P-RES | YRS | TYPE | ONCE |
|---|---|---|---|---|---|---|---|---|---|---|---|---|---|
| RP | Philippines | Yes | 21 | Yes | Yes | No |  | Yes | No | No | 2 | 2 | No |
| PL | Poland | Yes | 17 | Yes | Yes | No |  | Yes | No | Yes | 2 | 2 | No |
| RO | Romania | Yes | 19 | Yes | Yes | No |  | Yes | No | Yes | 2 | 2 | No |
| RS | Russia | No |  | No | No | No |  | No | No | No |  |  | No |
| RS | Russia (old) | Yes | VI(1) | Yes | No | Yes | 100 | Yes | Yes | Yes | 2 | 7 | No |
| LO | Slovak Republic | Yes | 21 | Yes | Yes | No |  | Yes | No | Yes | 2 |  | Yes |
| SP | Spain | No |  | No | No | No |  | No | No | No |  |  | No |
| SW | Sweden | Yes | XII(3) | Yes | Yes | No |  | Yes | Yes | Yes | 2 | 1 | No |
| SZ | Switzerland | Yes | XII | Yes | No | No |  | No | Yes | Yes | 2 | 1 | No |
| TI | Tajikistan | Yes | VI(1) | Yes | No | Yes | 100 | Yes | Yes | Yes | 2 | 7 | No |
| TD | Trinidad and Tabag | Yes | 18 | Yes | Yes | No |  | Yes | No | Yes | 2 | 3 | No |
| TS | Tunisia | No |  | No | No | No |  | No | No | No |  |  | No |
| TX | Turkmenistan | Yes | VI(1) | Yes | No | Yes | 100 | Yes | Yes | Yes | 2 | 7 | No |
| UP | Ukraine | Yes | VI(1) | Yes | No | Yes | 100 | Yes | Yes | Yes | 2 | 7 | No |
| UK | United Kingdom | Yes | 20 | Yes | Yes | No |  | Yes | No | Yes | 2 | 6 | No |
| UZ | Uzbekistan | Yes | VI(1) | Yes | No | Yes | 100 | Yes | Yes | Yes | 2 | 7 | No |

*Fig. 6C-1*

| Code | Country | RETRO | CLMT | CL-TP | LIMIT | TRST | TRWH | TR-RP | ST# | STRES | ELEC | FLTM | EDIN |
|---|---|---|---|---|---|---|---|---|---|---|---|---|---|
| AM | Armenia | No | Yes | | 5 | No | T13 | 87-9 | VI(1) | No | No | Yes | Yes |
| AS | Australia | No | No | | 0 | No | | | 20 | No | No | Yes | No |
| AU | Austria | No | No | | 0 | No | T02 | 87-9 | XIII | No | No | Yes | Yes |
| AJ | Azerbaijan | No | Yes | | 5 | No | T13 | 87-9 | VI(1) | No | No | Yes | Yes |
| BB | Barbados | No | No | | 0 | No | | | 20 | No | Yes | Yes | No |
| BO | Belarus | No | Yes | | 5 | No | T13 | 87-9 | VI(1) | No | No | Yes | Yes |
| BE | Belgium | No | Yes | | 5 | No | T04 | 87-9 | 21 | No | No | Yes | Yes |
| CA | Canada | No | No | | 0 | No | | | XX | No | No | Yes | No |
| CH | China | No | No | | 0 | No | T07 | 87-9 | 20 | No | No | Yes | No |
| CY | Cyprus | No | No | | 0 | No | | | 21 | No | No | Yes | Yes |
| EZ | Czech Republic | No | No | | 0 | No | T01 | | 21 | No | No | Yes | Yes |
| DA | Denmark | No | No | | 0 | No | T02 | 87-9 | XIII | No | No | Yes | No |
| EG | Egypt | No | Yes | | 5 | Yes | T03 | 87-9 | 23 | No | No | Yes | Yes |
| FI | Finland | No | No | | 0 | No | | | 20 | No | No | Yes | No |
| FR | France | No | No | | 0 | No | T08 | 87-9 | 18 | No | No | Yes | Yes |
| GG | Georgia | No | Yes | | 5 | No | TI3 | 87-9 | VI(1) | No | No | Yes | Yes |
| GM | Germany | Yes | No | | 0 | No | T15 | 93-22 | 20 | No | No | Yes | No |
| GR | Greece | No | No | | 0 | No | T09 | 87-9 | XII | No | No | Yes | No |
| HU | Hungary | No | No | | 0 | No | T03 | 87-9 | 18 | No | Yes | Yes | No |
| IC | Iceland | No | Yes | | 5 | Yes | T05 | 87-9 | 22 | No | No | Yes | No |
| IN | India | Yes | No | | 0 | No | T17 | 93-22 | 21 | No | No | Yes | No |
| ID | Indonesia | No | No | | 0 | No | T16 | 93-22 | 19 | No | No | Yes | No |
| EI | Ireland | No | No | | 0 | No | T02 | 87-9 | XIX | No | No | Yes | No |
| IS | Israel | No | Yes | | 5 | Yes | T01 | | 24 | No | No | Yes | No |
| IT | Italy | No | No | | 0 | No | T10 | 87-9 | XII | No | No | Yes | No |
| JM | Jamaica | No | No | | 0 | No | T06 | 87-9 | 21 | No | Yes | Yes | No |
| JA | Japan | No | Yes | | 5 | No | T04 | 87-9 | 20 | No | No | Yes | No |
| KZ | Kazakhstan | No | Yes | | 5 | No | T13 | 87-9 | VI | No | No | Yes | Yes |
| KS | Korea | No | Yes | | 5 | No | T03 | 87-9 | 21 | No | No | Yes | No |
| KG | Kyrgyzstan | No | Yes | | 5 | No | T13 | 87-9 | VI | No | No | Yes | Yes |
| LU | Luxembourg | No | No | | 0 | No | T11 | 87-9 | XIV | No | No | Yes | No |
| MT | Malta | Yes | No | | 0 | No | T99 | | 22 | No | Yes | Yes | No |
| MX | Mexico | No | No | | 0 | No | | | 21 | No | No | Yes | No |
| MD | Moldova | No | Yes | | 5 | No | T13 | 87-9 | VI | No | No | Yes | Yes |
| MO | Morocco | No | No | | 0 | No | | | 18 | No | No | Yes | Yes |
| NL | Netherlands | Yes | No | | 0 | Yes | T01 | | 20 | No | No | Yes | Yes |
| NL | Netherlands (old) | No | No | | 0 | Yes | T04 | 87-9 | XVIII | No | No | Yes | No |
| NZ | New Zealand | No | No | | 0 | No | | | 20 | No | No | Yes | No |
| NO | Norway | No | Yes | | 5 | No | T05 | 87-9 | 16 | No | No | Yes | Yes |
| PK | Pakistan | No | No | | 0 | No | T02 | 87-9 | XIII | Yes | No | Yes | Yes |

*Fig. 6C-2*

| Code | Country | RETRO | CLMT | CL-TP | LIMIT | TRST | TRWH | TR-RP | ST# | STRES | ELEC | FLTM | EDIN |
|---|---|---|---|---|---|---|---|---|---|---|---|---|---|
| RP | Philippines | No | Yes | | 5 | Yes | T03 | 87-9 | 22 | No | No | Yes | Yes |
| PL | Poland | No | Yes | | 5 | Yes | T03 | 87-9 | 18 | No | No | Yes | Yes |
| RO | Romania | No | Yes | | 5 | Yes | T03 | 87-9 | 20 | No | No | Yes | Yes |
| RS | Russia | No | No | | 0 | No | | | 18 | No | No | Yes | No |
| RS | Russia (old) | No | No | | 0 | No | T13 | 87-9 | VI | No | No | Yes | No |
| LO | Slovak Republic | No | No | | 0 | No | T01 | | 21 | No | No | Yes | No |
| SP | Spain | No | No | | 0 | No | | | 22 | No | No | Yes | Yes |
| SW | Sweden | No | No | | 0 | No | T11 | 87-9 | 12 | No | No | Yes | No |
| SZ | Switzerland | No | No | | 0 | No | T02 | 87-9 | XIII | No | No | Yes | No |
| TI | Tajikistan | No | Yes | | 5 | No | T13 | 87-9 | VI | No | No | Yes | Yes |
| TD | Trinidad and Tabag | No | No | | 0 | No | T12 | 87-9 | 19 | No | No | Yes | Yes |
| TS | Tunisa | No | No | | 0 | No | | 20 | | No | No | Yes | No |
| TX | Turkmenistan | No | Yes | | 5 | No | T13 | 87-9 | VI | No | No | Yes | Yes |
| UP | Ukraine | No | Yes | | 5 | No | T13 | 87-9 | VI | No | No | Yes | Yes |
| UK | United Kingdom | Yes | No | | 0 | No | T14 | 93-22 | 21 | No | No | Yes | No |
| UZ | Uzbekistan | No | Yes | | 5 | No | T13 | 87-9 | VI | No | No | Yes | Yes |

*Fig. 6D-1*

| Code | Country | ACCR | ET+ | INST | TRN | TRTP | ALL | BUS | SPEC | PROF | FLTM | RSnF | SnFST |
|---|---|---|---|---|---|---|---|---|---|---|---|---|---|
| AM | Armenia | No | Yes | 2 | Yes | | No | No | No | No | No | No | No |
| AS | Australia | No | No | | No | | No | No | No | No | No | No | No |
| AU | Austria | No | No | | Yes | | No | No | No | No | Yes | Yes | Yes |
| AJ | Azerbaijan | No | Yes | 2 | Yes | | No | No | No | No | No | No | No |
| BB | Barbados | No | No | | Yes | | No | No | No | No | Yes | No | No |
| BO | Belarus | No | Yes | 2 | Yes | | No | No | No | No | No | No | No |
| BE | Belgium | Yes | No | | Yes | | No | No | No | No | Yes | Yes | Yes |
| CA | Canada | No | No | | Yes | | No | No | No | No | Yes | No | No |
| CH | China | No | No | | Yes | | No | No | No | No | Yes | No | No |
| CY | Ctprus | Yes | No | | Yes | | No | No | No | No | Yes | Yes | Yes |
| EZ | Czech Republic | Yes | No | | Yes | | No | No | No | No | Yes | No | No |
| DA | Denmark | No | No | | Yes | | No | No | No | No | Yes | No | No |
| EG | Egypt | Yes | No | | Yes | | No | No | No | No | Yes | Yes | Yes |
| FI | Finland | No | No | | Yes | | No | No | No | No | Yes | No | No |
| FR | France | Yes | No | | Yes | | No | No | No | No | Yes | Yes | Yes |
| GG | Georgia | No | Yes | 2 | Yes | | No | No | No | No | No | No | No |
| GM | Germany | No | No | | Yes | | No | No | No | No | Yes | Yes | Yes |
| GR | Greece | No | No | | No | | No | No | No | No | No | No | No |
| HU | Hungary | No | No | | No | | No | No | No | No | No | No | No |
| IC | Iceland | Yes | No | | Yes | | No | No | No | No | Yes | Yes | Yes |
| IN | India | No | No | | No | | No | No | No | No | No | No | No |
| ID | Indonesia | Yes | No | | Yes | | No | No | No | No | Yes | Yes | Yes |
| EI | Ireland | No | No | | No | | No | No | No | No | No | No | No |
| IS | Israel | Yes | No | | Yes | | No | No | No | No | Yes | Yes | Yes |
| IT | Italy | No | No | | No | | No | No | No | No | No | No | No |
| JM | Jamaica | No | No | | No | | No | No | No | No | No | No | No |
| JA | Japan | Yes | No | | Yes | | No | No | No | No | Yes | Yes | Yes |
| KZ | Kazakhstan | No | Yes | 2 | Yes | | No | No | No | No | No | No | No |
| KS | Korea | Yes | No | | Yes | | No | No | No | No | Yes | Yes | Yes |
| KG | Kyrgyzstan | No | Yes | 2 | Yes | | No | No | No | No | No | No | No |
| LU | Luxembourg | No | No | | No | | No | No | No | No | No | No | No |
| MT | Malta | No | No | | No | | No | No | No | No | No | No | No |
| MX | Mexico | No | No | | No | | No | No | No | No | No | No | No |
| MD | Moldova | No | Yes | 2 | Yes | | No | No | No | No | No | No | No |
| MO | Morocco | Yes | No | | Yes | | No | No | No | No | Yes | Yes | Yes |
| NL | Netherlands | Yes | No | | Yes | | No | No | No | No | Yes | Yes | Yes |
| NL | Netherlands (old) | No | No | | No | | No | No | No | No | No | No | No |
| NZ | New Zealand | No | No | | No | | No | No | No | No | No | No | No |
| NO | Norway | Yes | No | | Yes | | No | No | No | No | Yes | Yes | Yes |

*Fig. 6D-2*

| Code | Country | ACCR | ED+ | INST | TRN | TRTP | ALL | BUS | SPEC | PROF | FLTM | RSnF | SnFST |
|---|---|---|---|---|---|---|---|---|---|---|---|---|---|
| PK | Pakistan | No | No | | No | | No | No | No | No | No | No | No |
| RP | Philippines | Yes | No | | Yes | | No | No | No | No | Yes | Yes | Yes |
| PL | Poland | Yes | No | | Yes | | No | No | No | No | Yes | Yes | Yes |
| RO | Romania | Yes | No | | Yes | | No | No | No | No | Yes | Yes | Yes |
| RS | Russia | No | No | | No | | No | No | No | No | No | No | No |
| RS | Russia (old) | No | No | | No | | No | No | No | No | No | No | No |
| LO | Slovak Republic | Yes | No | | Yes | | No | No | No | No | Yes | Yes | Yes |
| SP | Spain | No | No | | No | | No | No | No | No | No | No | No |
| SW | Sweden | No | No | | No | | No | No | No | No | No | No | No |
| SZ | Switzerland | No | No | | No | | No | No | No | No | No | No | No |
| TI | Tajikistan | No | No | | Yes | | No | No | No | No | No | No | No |
| TD | Trinidad and Tabag | Yes | No | | Yes | | No | No | No | No | Yes | Yes | Yes |
| TS | Tunisia | No | No | | No | | No | No | No | No | No | No | No |
| TX | Turkmenistan | No | No | | Yes | | No | No | No | No | No | No | No |
| UP | Ukraine | No | No | | Yes | | No | No | No | No | No | No | No |
| UK | United Kingdom | No | No | | No | | No | No | No | No | No | No | No |
| UZ | Uzbekistan | No | No | | Yes | | No | No | No | No | No | No | No |

*Fig. 6E-1*

| Code | Country | SnFRS | SnFTR | CHAR | GVT | RMIT | RMP# | LIMIT | T-LMT | LMT | A-LMT | LMT |
|---|---|---|---|---|---|---|---|---|---|---|---|---|
| AM | Armenia | No | No | No | No | Yes | (d) | Yes | Yes | 5 | Yes | 9999 |
| AS | Australia | No | No | No | No | Yes | | No | No | 0 | No | 0 |
| AU | Austria | Yes | Yes | Yes | No | Yes | (1)&(2) | No | No | 0 | No | 0 |
| AJ | Azerbaijan | No | No | No | No | Yes | (d) | Yes | Yes | 5 | Yes | 9999 |
| BB | Barbados | No | No | No | No | Yes | [1] | No | No | 0 | No | 0 |
| BO | Belarus | No | No | No | No | Yes | (d) | Yes | Yes | 5 | Yes | 9999 |
| BE | Belgium | Yes | No | No | No | Yes | [1] | Yes | No | 0 | No | 0 |
| CA | Canada | No | No | No | No | Yes | | No | No | 0 | No | 0 |
| CH | China | No | No | No | No | Yes | | No | No | 0 | No | 0 |
| CY | Cyprus | Yes | No | Yes | Yes | Yes | [1] | Yes | No | 0 | No | 0 |
| EZ | Czech Republic | No | No | No | No | Yes | [1] | Yes | No | 0 | No | 0 |
| DA | Denmark | No | No | No | No | Yes | | No | No | 0 | No | 0 |
| EG | Egypt | Yes | No | Yes | Yes | Yes | [1] | Yes | No | 0 | No | 0 |
| FI | Finland | No | No | No | No | Yes | | No | No | 0 | No | 0 |
| FR | France | Yes | No | Yes | Yes | Yes | [1] | Yes | No | 0 | No | 0 |
| GG | Georgia | No | No | No | N o | Yes | (d) | Yes | Yes | 5 | Yes | 9999 |
| GM | Germany | Yes | Yes | Yes | No | Yes | [2] | No | No | 0 | No | 0 |
| GR | Greece | No | No | No | No | Yes | | No | No | 0 | No | 0 |
| HU | Hungary | No | No | No | No | Yes | [1] | No | No | 0 | No | 0 |
| IC | Iceland | Yes | No | Yes | Yes | Yes | [1] | Yes | No | 0 | No | 0 |
| IN | India | No | No | No | No | Yes | | No | No | 0 | No | 0 |
| ID | Indonesia | Yes | No | Yes | Yes | Yes | [1] | Yes | No | 0 | No | 0 |
| EI | Ireland | No | No | No | No | Yes | | No | No | 0 | No | 0 |
| IS | Israel | Yes | No | Yes | Yes | Yes | [1] | Yes | No | 0 | No | 0 |
| IT | Italy | No | No | No | No | Yes | | No | No | 0 | No | 0 |
| JM | Jamaica | No | No | No | No | Yes | [1] | No | No | 0 | No | 0 |
| JA | Japan | Yes | No | Yes | No | Yes | [1] | Yes | No | 0 | No | 0 |
| KZ | Kazakhstan | No | No | No | No | Yes | (d) | Yes | Yes | 5 | Yes | 9999 |
| KS | Korea | Yes | No | Yes | Yes | Yes | [1] | Yes | No | 0 | No | 0 |
| KG | Kyrgyzstan | No | No | No | No | Yes | (d) | Yes | Yes | 5 | Yes | 9999 |
| LU | Luxembourg | No | No | No | No | Yes | | No | No | 0 | No | |
| MT | Malta | No | No | No | No | Yes | | No | No | 0 | No | 0 |
| MX | Mexico | No | No | No | No | Yes | | No | No | 0 | No | 0 |
| MD | Moldova | No | No | no | No | Yes | (d) | Yes | Yes | 5 | Yes | 9999 |
| MO | Morocco | Yes | No | Yes | Yes | Yes | [1] | Yes | no | 0 | No | 0 |
| NL | Netherlands | Yes | Yes | Yes | Yes | Yes | [1] | Yes | No | 0 | No | 0 |
| NL | Netherlands (old) | No | No | No | No | Yes | | No | No | 0 | No | 0 |
| NW | New Zealand | No | No | No | No | Yes | | No | No | 0 | No | 0 |
| NO | Norway | Yes | No | Yes | Yes | Yes | [1] | Yes | No | 0 | No | 0 |
| PK | Pakistan | No | No | No | No | Yes | | No | No | 0 | No | 0 |

*Fig. 6E-2*

| Code | Country | SnFRS | SnFTR | CHAR | GVT | RMIT | RMP# | LIMIT | T-LMT | LMT | A-LMT | LMT |
|---|---|---|---|---|---|---|---|---|---|---|---|---|
| RP | Philippines | Yes | No | Yes | Yes | Yes | [1] | Yes | No | 0 | No | 0 |
| PL | Poland | Yes | No | Yes | Yes | Yes | [1] | Yes | No | 0 | No | 0 |
| RO | Romania | Yes | No | Yes | Yes | Yes | [1] | Yes | No | 0 | No | 0 |
| RS | Russia | No | No | No | No | Yes | | No | No | 0 | No | 0 |
| RS | Russia (old) | No | No | No | No | Yes | (d) | Yes | Yes | 5 | Yes | 9999 |
| LO | Slovak Republic | Yes | No | Yes | Yes | Yes | [1] | Yes | No | 0 | No | 0 |
| SP | Spain | No | No | No | No | Yes | | No | No | 0 | No | 0 |
| SW | Sweden | No | No | No | No | Yes | | No | No | 0 | No | 0 |
| SZ | Switzerland | No | No | No | No | Yes | | No | No | 0 | No | 0 |
| TI | Tajikstan | No | No | No | No | Yes | (d) | Yes | Yes | 5 | Yes | 9999 |
| TD | Trinidad and Tabag | Yes | No | Yes | Yes | Yes | [1] | Yes | No | 0 | No | 0 |
| TS | Tunisia | No | No | No | No | Yes | | No | No | 0 | No | 0 |
| TX | Turkmenistan | No | No | No | No | Yes | (d) | Yes | Yes | 5 | Yes | 9999 |
| UP | Ukraine | No | No | No | No | Yes | (d) | Yes | Yes | 5 | Yes | 9999 |
| UK | United Kingdom | No | No | No | No | Yes | | No | No | 0 | No | 0 |
| UZ | Uzbekistan | No | No | No | No | Yes | (d) | Yes | Yes | 5 | Yes | 9999 |

*Fig. 6F-1*

| Code | Country | CLMT | SnF | SnFp | USSnF | CHAR | GVT | LIMIT | T-LMT | LMT | A-LMT | LMT |
|---|---|---|---|---|---|---|---|---|---|---|---|---|
| AM | Armenia | Yes | Yes | (d) | Yes | No | No | No | Yes | 5 | Yes | 9999 |
| AS | Australia | No | No | | No | No | No | No | No | 0 | No | 0 |
| AU | Austria | No | Yes | [3] | Yes | Yes | No | No | No | 0 | No | 0 |
| AJ | Azerbaijan | Yes | Yes | (d) | Yes | No | No | No | Yes | 5 | Yes | 9999 |
| BB | Barbados | No | No | | No | No | No | No | No | 0 | No | 0 |
| BO | Belarus | Yes | Yes | (d) | Yes | No | No | No | Yes | 5 | Yes | 9999 |
| BE | Belgium | Yes | Yes | [1] | Yes | No | No | No | No | 0 | No | 0 |
| CA | Canada | No | No | | No | No | No | No | No | 0 | No | 0 |
| CH | China | No | Yes | | Yes | No | No | No | No | 0 | No | 0 |
| CY | Cyprus | Yes | Yes | [1] | Yes | Yes | Yes | No | No | 0 | No | 0 |
| EZ | Czech Republic | No | Yes | [1] | Yes | No | No | No | No | 0 | No | 0 |
| DA | Denmark | No | No | | No | No | No | No | No | 0 | No | 0 |
| EG | Egypt | Yes | Yes | [1] | Yes | Yes | Yes | No | No | 0 | No | 0 |
| FI | Finland | No | No | | No | No | No | No | No | 0 | No | 0 |
| FR | France | Yes | Yes | [1] | Yes | Yes | Yes | No | No | 0 | No | 0 |
| GG | Georgia | Yes | Yes | (d) | Yes | No | No | No | Yes | 5 | Yes | 9999 |
| GM | Germany | No | No | | No | Yes | No | No | No | 0 | No | 0 |
| GR | Greece | No | No | | No | No | No | No | No | 0 | No | 0 |
| HU | Hungary | No | No | | No | No | No | No | No | 0 | No | 0 |
| IC | Iceland | Yes | Yes | [1] | Yes | Yes | Yes | No | No | 0 | No | 0 |
| IN | India | No | No | | No | No | No | No | No | 0 | No | 0 |
| ID | Indonesia | No | Yes | [1] | Yes | Yes | Yes | No | No | 0 | No | 0 |
| EI | Ireland | No | No | | No | No | No | No | No | 0 | No | 0 |
| IS | Israel | Yes | Yes | [1] | Yes | Yes | Yes | No | No | 0 | No | 0 |
| IT | Italy | No | No | | No | No | No | No | No | 0 | No | 0 |
| JM | Jamaica | No | No | | No | No | No | No | No | 0 | No | 0 |
| JA | Japan | Yes | Yes | [1] | Yes | Yes | No | No | No | 0 | No | 0 |
| KZ | Kazakhstan | Yes | Yes | (d) | Yes | No | No | No | Yes | 5 | Yes | 9999 |
| KS | Korea | Yes | No | | Yes | Yes | Yes | No | No | 0 | No | 0 |
| KG | Kyrgystan | Yes | Yes | (d) | No | No | No | No | Yes | 5 | Yes | 9999 |
| LU | Luxembourg | No | No | | No | No | No | No | No | 0 | No | |
| MT | Malta | No | No | | No | No | No | No | No | 0 | No | 0 |
| MX | Mexico | No | No | | No | No | No | No | No | 0 | No | 0 |
| MD | Moldova | Yes | Yes | (d) | Yes | No | No | No | Yes | 5 | Yes | 9999 |
| MO | Morocco | No | Yes | [1] | Yes | Yes | Yes | No | No | 0 | No | 0 |
| NL | Netherlands | Yes | Yes | [2] | Yes | Yes | Yes | No | No | 0 | No | 0 |
| NL | Netherlands (Old) | No | No | | No | No | No | No | No | 0 | No | 0 |
| NZ | New Zealand | No | No | | No | No | No | No | No | 0 | No | 0 |
| NO | Norway | Yes | Yes | [1] | Yes | Yes | Yes | No | No | 0 | No | 0 |

*Fig. 6F-2*

| Code | Country | CLMT | SnF | SnFP | USSnf | CHAR | GVT | LIMIT | T-LMT | LMT | A-LMT | LMT |
|---|---|---|---|---|---|---|---|---|---|---|---|---|
| PK | Pakistan | No | No | | No | No | No | No | No | 0 | No | 0 |
| RP | Philippines | Yes | Yes | [1] | Yes | Yes | Yes | No | No | 0 | No | 0 |
| PL | Poland | Yes | Yes | [1] | Yes | Yes | Yes | No | No | 0 | No | 0 |
| RO | Romania | Yes | Yes | [1] | Yes | Yes | Yes | No | No | 0 | No | 0 |
| RS | Russia | No | No | | No | No | No | No | No | 0 | No | 0 |
| RS | Russia (old) | No | Yes | (d) | Yes | No | No | No | Yes | 5 | Yes | 9999 |
| LO | Slovak Republic | No | Yes | [1] | Yes | Yes | Yes | No | No | 0 | No | 0 |
| SP | Spain | Yes | Yes | [1] | Yes | No | No | No | No | 0 | No | 0 |
| SW | Sweden | No | No | | No | No | No | No | No | 0 | No | 0 |
| SZ | Switzerland | No | No | | No | No | No | No | No | 0 | No | 0 |
| TI | Tajakistan | Yes | Yes | (d) | Yes | No | No | No | Yes | 5 | Yes | 9999 |
| TD | Trinidad and Tabag | No | Yes | [1] | Yes | Yes | Yes | No | No | 0 | No | 0 |
| TS | Tunisia | No | No | | No | No | No | No | No | 0 | No | 0 |
| TX | Turkmenistan | Yes | Yes | (d) | Yes | No | No | No | Yes | 5 | Yes | 9999 |
| UP | Ukraine | Yes | Yes | (d) | Yes | No | No | No | Yes | 5 | Yes | 9999 |
| UK | United Kingdom | No | No | | No | No | No | No | No | 0 | No | 0 |
| UZ | Uzbekistan | Yes | Yes | (d) | Yes | No | No | No | Yes | 5 | Yes | 9999 |

*Fig. 6G-1*

| Code | Country | CLMT | ST-US | ST-P# | CMP-R | CMP-T | STWH | ST-RP | AMT | ADJ | RPER | LIMIT |
|---|---|---|---|---|---|---|---|---|---|---|---|---|
| AM | Armenia | No | No | | No | No | | | | No | No | 5 |
| AS | Australia | No | No | | No | No | | | | No | No | 0 |
| AU | Austria | No | No | | No | No | | | | No | No | 0 |
| AJ | Azberbaijan | Yes | No | | No | No | | | | No | No | 5 |
| BB | Barbados | Yes | No | | No | No | | | | No | No | 0 |
| BO | Belarus | No | No | | No | No | | | | No | No | 5 |
| BE | Belgium | Yes | Yes | [1] | No | No | S02 | 87-8 | 2000 | No | Yes | 5 |
| CA | Canada | No | No | | No | No | | | | No | No | 0 |
| CH | China | Yes | Yes | | No | No | S04 | 87-8 | 5000 | No | Yes | 0 |
| CY | Cyprus | No | Yes | [1] | No | No | S05 | 87-8 | 2000 | No | No | 5 |
| EZ | Czech Republic | No | Yes | [1] | No | No | S01 | | 5000 | No | No | 0 |
| DA | Denmark | Yes | No | | No | No | | | | No | No | 0 |
| EG | Egypt | No | Yes | [1] | No | No | S06 | 87-8 | 3000 | No | No | 5 |
| FI | Finland | Yes | No | | No | No | | | | No | No | 0` |
| FR | France | Yes | Yes | [1] | No | No | S03 | 87-8 | 2000 | Yes | Yes | 5 |
| GG | Georgia | No | No | | No | No | | | | No | No | 0 |
| GM | Germany | No | Yes | [1] | No | No | S11 | 93-22 | 5000 | No | No | 4 |
| GR | Greece | No | No | | No | No | | | | No | No | 0 |
| HU | Hungary | Yes | No | | No | No | | | | No | No | 0 |
| IC | Iceland | No | Yes | [1] | No | No | S02 | 87-8 | 2000 | No | Yes | 5 |
| IN | India | Yes | No | | No | No | | | | No | No | 0 |
| ID | Indonesia | No | Yes | [1] | No | No | S13 | 93-22 | 2000 | No | No | 5 |
| EI | Ireland | No | No | | No | No | | | | No | No | 0 |
| IS | Israel | No | Yes | [1] | No | No | S01 | | 3000 | No | No | 0 |
| IT | Italy | Yes | No | | No | No | | | | No | No | 0 |
| JM | Jamaica | Yes | No | | No | No | | | | No | No | 0 |
| JA | Japan | No | Yes | [1] | No | No | S02 | 87-8 | 2000 | No | Yes | 5 |
| KZ | Kazakhstan | No | No | | No | No | | | 0 | No | No | 0 |
| KS | Korea | Yes | Yes | [1] | No | No | S02 | 87-8 | 2000 | No | Yes | 5 |
| KG | Kyrgyzstan | Yes | No | | No | No | | | | No | No | 0 |
| LU | Luxembourg | Yes | No | | No | No | | | | No | No | 0 |
| MT | Malta | No | No | | No | No | | | | No | No | 0 |
| MX | Mexico | Yes | No | | No | No | | | | No | No | 0 |
| MD | Moldova | No | No | | No | No | | | | No | No | 0 |
| MO | Morocco | No | Yes | [1] | No | No | S07 | 87-8 | 2000 | No | No | 5 |
| NL | Netherlands | No | Yes | [1] | No | No | S01 | | 2000 | No | No | 0 |
| NL | Netherlands (old) | Yes | Yes | [1] | No | No | S03 | 87-8 | 0 | No | Yes | 5 |
| NZ | New Zealand | No | No | | No | No | | | | No | No | 0 |
| NO | Norway | No | Yes | [1] | No | No | S02 | 87-8 | 2000 | No | Yes | 5 |
| PK | Pakistan | Yes | Yes | | No | No | S08 | 87-8 | 5000 | No | No | 0 |

*Fig. 6G-2*

| Code | Country | CLMT | ST-US | ST-P# | CMP-R | CMP-T | STWH | ST-RP | AMT | ADJ | RPER | LIMIT |
|---|---|---|---|---|---|---|---|---|---|---|---|---|
| RP | Philippines | No | Yes | [1] | No | No | S09 | 87-8 | 3000 | No | No | 5 |
| PL | Poland | Yes | Yes | [1] | No | No | S02 | 87-8 | 2000 | No | Yes | 5 |
| RO | Romania | Yes | Yes | [1] | No | No | S02 | 87-8 | 2000 | No | Yes | 5 |
| RS | Russia | No | Yes | [1] | No | No | | | | No | No | 0 |
| RS | Russia (old) | Yes | No | | No | No | | | | No | No | 0 |
| LO | Slovak Republic | No | Yes | [1] | No | No | S01 | | 5000 | No | No | 0 |
| SP | Spain | No | Yes | [1] | No | No | S12 | 93-22 | 5000 | Yes | No | 5 |
| SW | Sweden | No | No | | No | No | | | | No | No | 0 |
| SZ | Switzerland | No | No | | No | No | | | | No | No | 0 |
| TI | Tajikistan | No | No | | No | No | | | | No | No | 0 |
| TD | Trinidad and Tabag | Yes | Yes | [1] | No | No | S03 | 87-8 | 2000 | No | Yes | 5 |
| TS | Tunisia | Yes | Yes | [1] | No | No | S14 | 93-22 | 4000 | No | No | 5 |
| TX | Turkmenistan | No | No | | No | No | | | | No | No | 0 |
| UP | Ukraine | Yes | No | | No | No | | | | No | No | 0 |
| UK | United Kingdom | Yes | No | | No | No | | | | No | No | 0 |
| UZ | Uzbekistan | No | No | | No | No | | | | No | No | 0 |

*Fig. 6H-1*

| Code | Country | CL-TP | POSTP | CLMT | EXP | EXUS | F-ER | TC-ER | AMT | EX-A | MAX | PER |
|---|---|---|---|---|---|---|---|---|---|---|---|---|
| AM | Armenia | | No | No | No | No | No | No | 0 | No | No | |
| AS | Australia | | No | No | No | No | No | No | 0 | No | No | |
| AU | Austria | | No | No | No | No | No | No | 0 | No | No | |
| AJ | Azerbaijan | | No | Yes | No | No | No | No | 0 | No | No | |
| BB | Barbados | | No | No | No | No | No | No | 0 | No | No | |
| BO | Belarus | | No | No | No | No | No | No | 0 | No | No | |
| BE | Belgium | | No | Yes | No | No | No | No | 0 | No | No | |
| CA | Canada | | No | No | No | No | No | No | 0 | No | No | |
| CH | China | | No | No | No | No | No | No | 0 | No | No | |
| CY | Cyprus | | Yes | No | No | No | No | No | 0 | No | No | |
| EZ | Czech Republic | | No | No | No | No | No | No | 0 | No | No | |
| DA | Denmark | | No | No | No | No | no | No | 0 | No | No | |
| EG | Egypt | | Yes | No | No | No | No | No | 0 | No | No | |
| FI | Finland | | No | No | No | No | No | No | 0 | No | No | |
| FR | France | | No | Yes | No | No | No | No | 0 | No | No | |
| GG | Georgia | | No | No | No | No | No | No | 0 | No | No | |
| GM | Germany | | No | No | No | No | No | No | 0 | No | No | |
| GR | Greece | | No | No | No | No | No | No | 0 | No | No | |
| HU | Hungary | | No | No | No | No | No | No | 0 | No | No | |
| IC | Iceland | | No | Yes | No | No | No | No | 0 | No | No | |
| IN | India | | No | No | No | No | No | No | 0 | No | No | |
| ID | Indonesia | | No | No | No | No | No | No | 0 | No | No | |
| EI | Ireland | | No | No | No | No | No | No | 0 | No | No | |
| IS | Israel | | No | Yes | No | No | No | No | 0 | No | No | |
| IT | Italy | | No | No | No | No | No | No | 0 | No | No | |
| JM | Jamaica | | No | No | No | No | No | No | 0 | No | No | |
| JA | Japan | | No | Yes | No | No | No | No | 0 | No | No | |
| KZ | Kazakhstan | | No | No | No | No | No | No | 0 | No | No | 0 |
| KS | Korea | | No | Yes | No | No | No | No | 0 | No | No | |
| KG | Kyrgyzstan | | No | No | No | No | No | No | 0 | No | No | |
| LU | Luxembourg | | No | No | No | No | No | No | 0 | No | No | |
| MA | Malta | | No | No | No | No | No | No | 0 | No | No | |
| MX | Mexico | | No | No | No | No | No | No | 0 | No | No | |
| MD | Moldova | | No | No | No | No | No | No | 0 | No | No | |
| MO | Morocco | | No | No | No | No | No | No | 0 | No | No | |
| NL | Netherlands | | No | No | No | No | No | No | 0 | No | no | |
| NL | Netherlands (old) | | No | No | No | No | No | No | 0 | no | No | 0 |
| NZ | New Zealand | | No | No | No | No | No | No | 0 | No | No | |
| NO | Norway | | No | Yes | No | No | No | No | 0 | No | No | |

*Fig. 6H-2*

| Code | Country | CL-TP | POSTP | CLMT | EXP | EXUS | F-ER | TC-ER | AMT | EX-A | MAX | PER |
|---|---|---|---|---|---|---|---|---|---|---|---|---|
| PK | Pakistan | | No | No | No | No | No | No | 0 | No | No | |
| RP | Philippines | | No | Yes | No | No | No | No | 0 | No | No | |
| PL | Poland | | No | Yes | No | No | No | No | 0 | No | No | |
| RO | Romania | | No | Yes | No | No | No | No | 0 | No | No | |
| RS | Russia | | No | No | No | No | No | No | 0 | No | No | |
| RS | Russia (old) | | No | No | No | No | No | No | 0 | No | No | |
| LO | Slovak Republic | | No | No | No | No | No | No | 0 | No | No | |
| SP | Spain | | No | No | No | No | No | No | 0 | No | No | |
| SW | Sweden | | No | No | No | No | No | No | 0 | No | No | |
| SZ | Switzerland | | No | No | No | No | No | No | 0 | No | No | |
| TI | Tajikistan | | No | No | No | No | No | No | 0 | No | No | |
| TD | Trinidad and Tabag | | No | No | No | No | No | No | 0 | No | No | |
| TS | Tunisia | | No | No | No | No | No | No | 0 | No | No | |
| TX | Turkmenistan | | No | No | No | No | No | No | 0 | No | No | |
| UP | Ukraine | | No | No | No | No | No | No | 0 | No | No | |
| UK | United Kingdom | | No | No | No | No | No | No | 0 | No | No | |
| UZ | Uzbekistan | | No | No | No | No | No | No | 0 | No | No | |

*Fig. 6I-1*

| Code | Country | EX-P | GPUS | AMT | MAX | PER | SE# | SERES | SEUS | MAX | AMT | LMT | F-PAY |
|---|---|---|---|---|---|---|---|---|---|---|---|---|---|
| AM | Armenia | No | No | 0 | No | | VII(2) | Yes | Yes | No | | No | No |
| AS | Australia | No | No | 0 | No | | 14 | Yes | Yes | No | | No | No |
| AU | Austria | No | No | 0 | No | | X | Yes | Yes | Yes | 3000 | Yes | Yes |
| AJ | Azerbaijan | No | No | 0 | No | | VII(2) | Yes | Yes | No | | No | No |
| BB | Barbados | No | No | 0 | No | | 14 | Yes | Yes | Yes | 5000 | Yes | No |
| BO | Belarus | No | No | 0 | No | | VII(2) | Yes | Yes | No | | No | No |
| BE | Belgium | No | No | 0 | No | | 14 | Yes | Yes | No | | No | No |
| CA | Canada | No | No | 0 | No | | XIV | Yes | Yes | No | | No | No |
| CH | China | No | No | 0 | No | | 13 | Yes | Yes | No | | No | No |
| CY | Cyprus | No | No | 0 | No | | 17 | Yes | Yes | No | | No | No |
| EZ | Czech Republic | No | No | 0 | No | | 14 | Yes | Yes | No | | No | No |
| DA | Denmark | No | No | 0 | No | | XI | Yes | Yes | Yes | 3000 | Yes | Yes |
| EG | Egypt | No | No | 0 | No | | 15 | Yes | Yes | No | | No | No |
| FI | Finland | No | No | 0 | No | | 14 | Yes | Yes | No | | No | No |
| FR | France | No | No | 0 | No | | 14 | Yes | Yes | No | | No | No |
| GG | Georgia | No | No | 0 | No | | VI(2) | Yes | Yes | No | | No | No |
| GM | Germany | No | No | 0 | No | | 14 | Yes | Yes | No | | No | No |
| GR | Greece | No | No | 0 | No | | X | Yes | Yes | Yes | E+04 | Yes | Yes |
| HU | Hungary | No | No | 0 | No | | 13 | Yes | Yes | No | | No | No |
| IC | Iceland | No | No | 0 | No | | 18 | Yes | Yes | No | | No | No |
| IN | India | No | No | 0 | No | | 15 | Yes | Yes | No | | No | No |
| ID | Indonesia | No | No | 0 | No | | 15 | Yes | Yes | No | | No | No |
| EI | Ireland | No | No | 0 | No | | XI | Yes | No | No | | No | Yes |
| IS | Israel | No | No | 0 | No | | 16 | Yes | Yes | No | | No | No |
| IT | Italy | No | No | 0 | No | | 14 | Yes | Yes | No | | No | No |
| JM | Jamaica | No | No | 0 | No | | 14 | Yes | Yes | Yes | 5000 | Yes | No |
| JA | Japan | No | No | 0 | No | | 14 | Yes | Yes | No | | No | No |
| KZ | Kazakhstan | No | No | 0 | No | 0 | VI(2) | Yes | Yes | No | | No | No |
| KS | Korea | No | No | 0 | No | | 18 | Yes | Yes | Yes | 3000 | Yes | No |
| KG | Kyrgyzstan | No | No | 0 | No | | VI(2) | Yes | Yes | No | | No | No |
| LU | Luxembourg | No | No | 0 | No | | XII | Yes | Yes | Yes | 3000 | Yes | Yes |
| MT | Malta | No | No | 0 | No | | 14 | Yes | Yes | Yes | E+04 | Yes | No |
| MX | Mexico | No | No | 0 | No | | 14 | Yes | Yes | No | | No | No |
| MD | Moldova | No | No | 0 | No | | VI(2) | Yes | Yes | No | | No | No |
| MO | Morocco | No | No | 0 | No | | 14 | Yes | Yes | Yes | 5000 | Yes | No |
| NL | Netherlands | No | No | 0 | No | | 15 | Yes | Yes | No | | No | No |
| NL | Netherlands (old) | No | No | 0 | No | | XVI | Yes | Yes | No | | No | No |
| NZ | New Zealand | No | No | 0 | No | | 14 | Yes | Yes | No | | No | No |
| NO | Norway | No | No | 0 | No | | 13 | Yes | Yes | No | | No | No |

*Fig. 6I-2*

| Code | Country | EX-P | GPUS | AMT | MAX | PER | SE# | SERES | SEUS | MAX | AMT | LMT | F-PAY |
|---|---|---|---|---|---|---|---|---|---|---|---|---|---|
| PK | Pakistan | No | No | 0 | No | | XI | Yes | No | No | | No | Yes |
| RP | Philippines | No | No | 0 | No | | 15 | Yes | Yes | Yes | E+04 | Yes | No |
| PL | Poland | No | No | 0 | No | | 15 | Yes | Yes | No | | No | No |
| RO | Romania | No | No | 0 | No | | 14 | Yes | Yes | No | | No | No |
| RS | Russia | No | No | 0 | No | | 13 | Yes | Yes | No | | No | No |
| RS | Russia (old) | No | No | 0 | No | | VI(2) | Yes | Yes | No | | No | No |
| LO | Slovak Republic | No | No | 0 | No | | 14 | Yes | Yes | No | | No | No |
| SP | Spain | No | No | 0 | No | | 15 | Yes | Yes | No | | No | No |
| SW | Sweden | No | No | 0 | No | | 15 | Yes | Yes | No | | No | No |
| SZ | Switzerland | No | No | 0 | No | | X | Yes | Yes | Yes | E+04 | Yes | Yes |
| TI | Tajikistan | No | No | 0 | No | | VI(2) | Yes | Yes | No | | No | No |
| TD | Trinidad and Tabag | No | No | 0 | No | | VI(2) | Yes | Yes | No | 3000 | No | No |
| TS | Tunisia | No | No | 0 | no | | 14 | Yes | Yes | Yes | 7500 | Yes | No |
| TX | Turkmenistan | No | No | 0 | No | | VI(2) | Yes | Yes | No | | No | No |
| UP | Ukraine | No | No | 0 | No | | VI(2) | Yes | Yes | No | | No | No |
| UK | United Kingdom | No | No | 0 | No | | 14 | Yes | Yes | No | | No | No |
| UZ | Uzbekistan | No | No | 0 | No | | VI(2) | Yes | Yes | No | | No | No |

*Fig. 6J-1*

| Code | Country | TC-Pay | TC-DA | #DAS | FX-BS | FBDA | FB#DA | DAYS | #DA | ROL12 | FTAX | EE# | EERES |
|---|---|---|---|---|---|---|---|---|---|---|---|---|---|
| AM | Armenia | No | No | | No | No | | Yes | 183 | No | No | VI | Yes |
| AS | Australia | No | No | | No | No | | Yes | 183 | No | Yes | | No |
| AU | Austria | Yes | No | | No | No | | No | | No | No | X | No |
| AJ | Azerbaijan | No | No | | No | No | | Yes | 183 | No | No | VI | Yes |
| BB | Barbados | No | No | | Yes | No | | Yes | 89 | No | No | | No |
| BO | Belarus | No | No | | No | No | | Yes | 183 | No | No | | No |
| BE | Belgium | No | No | | No | Yes | 182 | Yes | 182 | No | No | 15 | No |
| CA | Canada | No | No | | No | No | | No | | No | No | XV | No |
| CH | China | No | No | | Yes | No | | Yes | 183 | No | No | | No |
| CY | Cyprus | No | No | | Yes | No | | Yes | 182 | No | No | | No |
| EZ | Czech Republic | No | No | | Yes | No | | Yes | 182 | Yes | No | | No |
| DA | Denmark | Yes | Yes | 180 | No | No | | No | 89 | No | No | | No |
| EG | Egypt | No | No | | No | No | | Yes | 89 | No | No | | No |
| FI | Finland | No | No | | Yes | No | | No | | No | No | | No |
| FR | France | No | No | | Yes | Yes | 183 | Yes | 183 | No | No | | No |
| GG | Georgia | No | No | | No | No | | Yes | 183 | No | No | | No |
| GM | Germany | No | No | | Yes | No | | No | | No | No | | No |
| GR | Greece | Yes | No | | No | No | | Yes | 183 | No | No | | No |
| HU | Hungary | No | No | | Yes | No | | Yes | 183 | No | No | | No |
| IC | Iceland | No | No | | Yes | Yes | 182 | Yes | 182 | No | No | | No |
| IN | India | No | No | | Yes | No | | Yes | 89 | No | No | | No |
| ID | Indonesia | No | No | | Yes | No | | Yes | 119 | Yes | No | | No |
| EI | Ireland | Yes | No | | No | No | | Yes | 183 | No | No | | No |
| IS | Israel | No | No | | No | No | | Yes | 182 | No | No | | No |
| IT | Italy | No | No | | Yes | No | | Yes | 183 | No | No | | No |
| JM | Jamaica | No | No | | Yes | no | | Yes | 89 | No | No | | No |
| JA | Japan | No | No | | No | No | | No | | No | No | | No |
| KZ | Kazakhstan | No | No | | No | No | | Yes | 183 | Yes | No | | No |
| KS | Korea | No | No | | Yes | Yes | 182 | No | 182 | No | No | | No |
| KG | Kyrgyzstan | No | No | | No | No | | Yes | 183 | No | No | | No |
| LU | Luxembourg | Yes | No | | No | No | | Yes | 180 | No | No | | No |
| MT | Malta | No | No | | Yes | No | | Yes | 90 | No | No | | No |
| MX | Mexico | No | No | | Yes | No | | Yes | 183 | No | No | | No |
| MD | Moldova | No | No | | No | No | | Yes | 183 | No | No | | No |
| MO | Morocco | No | No | | Yes | Yes | 89 | No | | No | No | | No |
| NL | Netherlands | No | No | | Yes | No | | No | | No | No | | No |
| NL | Netherlands (old) | No | No | | Yes | No | | Yes | 183 | No | No | | No |
| NZ | New Zealand | No | No | | Yes | No | | Yes | 183 | Yes | No | | No |
| NO | Norway | No | No | | Yes | Yes | 182 | Yes | 182 | No | No | | No |
| PK | Pakistan | Yes | No | | No | No | | Yes | 183 | No | Yes | | No |

*Fig. 6J-2*

| Code | Country | TC-PAY | TC-DA | #DAS | FX-BS | FBDA | FB#DA | DAYS | #DA | ROL12 | FTAX | EE# | EERES |
|---|---|---|---|---|---|---|---|---|---|---|---|---|---|
| RP | Philippines | No | No | | Yes | No | | Yes | 89 | No | No | | No |
| PL | Poland | No | No | | No | No | | Yes | 182 | No | No | | No |
| RO | Romania | No | No | | Yes | No | | Yes | 182 | No | No | | No |
| RS | Russia | No | No | | Yes | No | | Yes | 183 | No | No | | No |
| RS | Russia (old) | No | No | | No | No | | Yes | 183 | No | No | | No |
| LO | Slovak Republic | No | No | | Yes | No | | Yes | 183 | No | No | | No |
| SP | Spain | No | No | | Yes | No | | No | | No | No | | No |
| SW | Sweden | Yes | Yes | 180 | No | No | | Yes | 89 | No | No | | No |
| SZ | Switzerland | Yes | No | | No | No | | Yes | 183 | No | No | | No |
| TI | Tajikistan | No | No | | No | No | | Yes | 183 | No | No | | No |
| TD | Trinidad and Tabag | No | No | | No | No | | Yes | 183 | No | No | | No |
| TS | Tunisia | No | No | | Yes | No | | Yes | 183 | No | No | | No |
| TX | Turkmenistan | No | No | | No | No | | Yes | 183 | No | No | | No |
| UP | Ukraine | No | No | | No | No | | Yes | 183 | No | No | | No |
| UK | United Kingdom | No | No | | Yes | No | | Yes | 182 | No | No | | No |
| UZ | Uzbekistan | No | No | | No | No | | Yes | 183 | No | No | | No |

*Fig. 6K-1*

| Code | Country | EEUS | MAX | AMT | LMT | CLMT | DAYS | #DA | ROL12 | FTAX | PER |
|---|---|---|---|---|---|---|---|---|---|---|---|
| AM | Armenia | Yes | No | 0 | No | No | Yes | 183 | No | No | |
| AS | Australia | No | No | 0 | No | No | No | | No | No | |
| AU | Austria | Yes | Yes | 3000 | No | No | Yes | 183 | No | No | |
| AJ | Azerbaijan | Yes | No | 0 | No | No | Yes | 183 | No | No | |
| BB | Barbados | No | No | 0 | No | No | No | | No | No | |
| BO | Belarus | No | No | 0 | No | No | No | | No | No | |
| BE | Belgium | No | No | 0 | No | No | No | | No | No | |
| CA | Canada | Yes | Yes | 10000 | No | No | No | | No | No | |
| CH | China | No | No | 0 | No | No | No | | No | No | |
| CY | Cyprus | No | No | 0 | No | No | No | | No | No | |
| EZ | Czech Republic | No | No | 0 | No | No | No | | No | No | |
| DA | Denmark | No | No | 0 | No | No | No | | No | No | |
| EG | Egypt | No | No | 0 | No | No | No | | No | No | |
| FI | Finland | No | No | 0 | No | No | No | | No | No | |
| FR | France | No | No | 0 | No | No | No | | No | No | |
| GG | Georgia | No | No | 0 | No | No | No | | No | No | |
| GM | Germany | No | No | 0 | No | No | No | | No | No | |
| GR | Greece | No | No | 0 | No | No | No | | No | No | |
| HU | Hungary | No | No | 0 | No | No | No | | No | No | |
| IC | Iceland | No | No | 0 | No | No | No | | No | No | |
| IN | India | No | No | 0 | No | No | No | | No | No | |
| ID | Indonesia | No | No | 0 | No | No | No | | No | No | |
| EI | Ireland | No | No | 0 | No | No | No | | No | No | |
| IS | Israel | No | No | 0 | No | No | No | | No | No | |
| IT | Italy | No | No | 0 | No | No | No | | No | No | |
| JM | Jamaica | No | No | 0 | No | No | No | | No | No | |
| JA | Japan | No | No | 0 | No | No | No | 0 | No | No | |
| KZ | Kazakhstan | No | No | 0 | No | No | No | | No | No | |
| KS | Korea | No | No | 0 | No | No | No | | No | No | |
| KG | Kyrgyzstan | No | No | 0 | No | No | No | | No | No | |
| LU | Luxembourg | No | No | 0 | No | No | No | | No | No | |
| MT | Malta | No | No | 0 | No | No | No | | No | No | |
| MX | Mexico | No | No | 0 | No | No | No | | No | No | |
| MD | Moldova | No | No | 0 | No | No | No | | No | No | |
| MO | Morocco | No | No | 0 | No | No | No | | No | No | |
| NL | Netherlands | No | No | 0 | No | No | No | | No | No | |
| NL | Netherlands (old) | No | No | 0 | No | No | No | 0 | No | No | |
| NZ | New Zealand | No | No | 0 | No | No | No | | No | No | |
| NO | Norway | No | No | 0 | No | No | No | | No | No | |

*Fig. 6K-2*

| Code | Country | EEUS | MAX | AMT | LMT | CLMT | DAYS | #DA | ROL12 | FTAX | PER |
|---|---|---|---|---|---|---|---|---|---|---|---|
| PK | Pakistan | No | No | 0 | No | No | No | | No | No | |
| RP | Philippines | No | No | 0 | No | No | No | | No | No | |
| PL | Poland | No | No | 0 | No | No | No | | No | No | |
| RO | Romania | No | No | 0 | No | No | No | | No | No | |
| RS | Russia | No | No | 0 | No | No | No | | No | No | |
| RS | Russia (old) | No | No | 0 | No | No | No | | No | No | |
| LO | Slovak Republic | No | No | 0 | No | No | No | | No | No | |
| SP | Spain | No | No | 0 | No | No | No | | No | No | |
| SW | Sweden | No | No | 0 | No | No | No | | No | No | |
| SZ | Switzerland | No | No | 0 | No | No | No | | No | No | |
| TI | Tajikistan | No | No | 0 | No | No | No | | No | No | |
| TD | Trinidad and Tabag | No | No | 0 | No | No | No | | No | No | |
| TS | Tunisia | No | No | 0 | No | No | No | | No | No | |
| TX | Turkmenistan | No | No | 0 | No | No | No | | No | No | |
| UP | Ukraine | No | No | 0 | No | No | No | | No | No | |
| UK | United Kingdom | No | No | 0 | No | No | No | | No | No | |
| UZ | Uzbekistan | No | No | 0 | No | No | No | | No | No | |

*Fig. 7A*

Date:

Last Name: ______________________________

First Name: ______________________________

Middle Initial: _____

Title: ______________________________

Post Title ______________________________

Institution's ID Number __________________

Social Security Number: __________________

| | | |
|---|---|---|
| Marital status | Single | Married |
| Spouse Here | Yes | No |

Number Other Dependents ____________________

First Country Citizenship ____________________

Passport Number ____________________

Second Country Citizenship ____________________

Passport Number ____________________

Fig. 7B

FULL NAME

1. What kind of Visa were you issued? eg F-1, J-1, M-1, etc.

2. If the visa is a "J-1" or "Q-1" what was the subtype? Pick from list below:

| | |
|---|---|
| *01 Student* | *07 Alien Physician* |
| *02 Short term scholars* | *08 International Visitor* |
| *03 Trainees Non Medical* | *09 Alien employee of the USIA* |
| *04 Teachers* | *10 Camp counselors* |
| *05 Professors* | *11 Medical Trainees* |
| *06 Specialists* | *12 Research Scholars* |

3. What is the ACTUAL Primary Activity of this visit? Pick from list below:

| | |
|---|---|
| *01 Studying Fulltime in a Degree program* | *06 Consulting* |
| *02 Studying Fulltime in a Non-Degree program* | *07 Conducting Research* |
| *03 Teaching* | *08 Training* |
| *04 Lecturing* | *09 Demonstrating Special Skills* |
| *05 Observing* | *10 Clinical Activities* |

4. What is the Start Date of this Visa for THIS Primary Activity? (Usually when you arrived in the USA)

5. What is the End of this Visa for THIS Primary Activity? (Usually when you finally left the USA)

6. What is the Visa Number issued to you for this visit?

7. Is every single dollar earned during the entire span of this Visa foreign funded? Yes/No 8. What country were/are you TAX resident at the beginning of this Visa? (What country do you pay income and other taxes to as a Resident?)

9. For RESEARCHERS only:
If you received any Tax Treaty Benefits on this Visa (should be with/for the same country as in question 8) were they under the:
   a. Student Article
      Usually Benefits last for 5 years but with a maximum amount of from $2000 to $5000.
   b. Teacher Article
      Usually a 2 year benefit limit ( 3 years from Greece or China) but no maximum annual amount.
   c. Other
   d. None

Fig. 7C

FULL NAME: DATE:

| Visa Type | Subtype | Primary Activity | Start Date DA/MO/YR | End Date DA/MO/YR | VISA Number | Foreign Funded | TAX Resident Country | Past Benefits |
|---|---|---|---|---|---|---|---|---|
| ____ | ____ | ____ | __/__/__ | __/__/__ | ____ | ____ | ____ | ____ |
| ____ | ____ | ____ | __/__/__ | __/__/__ | ____ | ____ | ____ | ____ |
| ____ | ____ | ____ | __/__/__ | __/__/__ | ____ | ____ | ____ | ____ |
| ____ | ____ | ____ | __/__/__ | __/__/__ | ____ | ____ | ____ | ____ |
| ____ | ____ | ____ | __/__/__ | __/__/__ | ____ | ____ | ____ | ____ |

Please provide the days away from the United States during the Visa period by calendar year. For example, if your visa was a J-1 researcher from August 15, 1992 through October 30, 1994, give the number of 24-hour days away from the U.S. for 1992 after obtaining the Visa, for 1993, and for 1994 through October.

| Visa Type | Calendar Year | # Days Away | Visa Type | Calendar Year | # Days Away |
|---|---|---|---|---|---|
| ____ | ____ | ____ | ____ | ____ | ____ |
| ____ | ____ | ____ | ____ | ____ | ____ |
| ____ | ____ | ____ | ____ | ____ | ____ |

*Fig. 7D*

FULL NAME: DATE:

Individual's Home Address:

Line 1 ____________________

Line 2 ____________________

Line 3 ____________________

City Postal Code ____________________

City ____________________

Region Postal Code ____________________

Country ____________________

Individual's USA Address:

Line 1 ____________________

Line 2 ____________________

Line 3 ____________________

City ____________________

State __________ Zip __________

Home Phone Number ____________________

Day Phone Number ____________________

Fax Number ____________________

*Fig. 7E*

FULL NAME: DATE:

Have you taken steps to obtain a "LPR" Visa? Yes
No

What country are you currently Tax Resident in?

Will you be Tax Resident in this country at the end of THIS taxable year? Yes No Can you prove a "Closer Connection" to your Tax Resident Country? Yes
No
(Have you ever completed a Form 8840)

Have you elected to be treated as a "Resident Alien"(RA) Yes No

Do you wish to claim Tax Treaty benefits if they are available Yes
No

If you are a student, pick category from the list below

*Undergraduate*
*Graduate but in USA as undergraduate previously*
*Graduate but in USA for first time for studies*
*Medical (Graduate) but in USA as undergraduate previously*
*Medical (Graduate) but in USA for first time for studies*

What is the name and phone number of your "Program Director"

Name

Phone

If you are employed in some way, what is your occupation?

*Fig. 7F*

FULL NAME: DATE:

SELF EMPLOYMENT INCOME and HONORIA

Answer the following questions only if you had income as SELF EMPLOYMENT INCOME and HONORIA:

Do you have, did you have, or will you have an office or other fixed base of operation?
YES NO Do you have business cards pointing to a non residence phone and or address?
YES NO IF YES to either, how many days has this office or base been and will be available to you in the taxable calender year? ____________ DAYS If your TAX Country of residence is either:

Czech Republic, Slovak Republic, Indonesia, Mexico, or New Zealand then

How many days have you been present and will you be present in any rolling twelve month period that includes this visit?
________________ DAYS If your TAX Country of Residence is not listed above then:

How many days have you been present and will you be present in the present calendar year? ____________ DAYS Add all days from all visits to the USA in the calendar year or rolling twelve months.

*Fig. 7G*

FULL NAME: DATE:

SCHOLARSHIPS, FELLOWSHIPS, and GRANTS

Answer the following questions only if you were awarded income from a scholarship, Fellowship, or Grant

| | | |
|---|---|---|
| Is this a "Qualified" scholarship? | Yes | No |
| Are you a degree candidate? | Yes | No |
| Is the Scholarship funded by an International organization? | Yes | No |
| Is the scholarship funded by a Foreign Source? | Yes | No |
| Is the scholarship funded by a Charitable Organization? | Yes | No |

What is the Name of the Funding Organization?

______________________________

| | | |
|---|---|---|
| Will you be staying less than one year in the USA? | Yes | No |
| Will you be studying outside of the USA? | Yes | No |

Fig. 9

Residency Analysis log for 127 Mr. Alan A AAAAA Phd at 12 Mar95 16:27
Residency: Id= 127 Year 1990
Current Days < 31. NRA.
CL02: IRC_FIT and FICA = NRA
Dc0405: Continuing Tax Resident.
DC0401: Treaty found. Continuing.
Dc0403: Tie Breaker Rule in effect. Continuing.
DC0409: Treaty Does not Cover FICA: CL05
CL05: TRT_FIT = NRA and FICA = null
Residency: Id=127 Year 1991
Days > 182 in Current Year. RA.
CL01: IRC_FIT and FICA = RA
Dc0405: Continuing Tax Resident.
DC0401: Treaty found. Continuing.
Dc0403: Tie Breaker Rule in effect. Continuing.
DC0409: Treaty Does not Cover FICA: CL05
CL05: TRT_FIT = NRA and FICA = null
Residency: Id=127 Year 1992
Prior status 'RA. Prior Year Present. Current Days > 30 in Current Year.
RA.
CL01: IRC_FIT and FICA = RA
Dc0405: Continuing Tax Resident.
DC0401: Treaty found. Continuing.
Dc0403: Tie Breaker Rule in effect. Continuing.
DC0409: Treaty Does not Cover FICA: CL05
CL05: TRT_FIT = NRA and FICA = null
Residency: Id=127 Year 1993
Prior status 'RA. Prior Year Present. Current Days > 30 in Current Year.
RA.
CL01: IRC_FIT and FICA = RA
Dc0405: Continuing Tax Resident.
DC0401: Treaty found. Continuing.
Dc0403: Tie Breaker Rule in effect. Continuing.
DC0409: Treaty Does not Cover FICA: CL05
CL05: TRT_FIT = NRA and FICA = null
Residency: Id=127 Year 1994
Prior status 'RA. Prior Year Present. Current Days > 30 in Current Year.
RA.
CL01: IRC_FIT and FICA = RA
Dc0405: Continuing Tax Resident.
DC0401: Treaty found. Continuing.
Dc0403: Tie Breaker Rule in effect. Continuing.
DC0409: Treaty Does not Cover FICA: CL05
CL05: TRT_FIT = NRA and FICA = null

*Fig. 10-1*

Treaty Analysis log for 127 Mr. Alan A AAAAA Phd at 19Mar95 19:43

Chart2: Individual is a Student
DC01: Income from Employment Services
Chart402: PB_TR Residency Reestablished with Visas starting 7/26/93
    127 1994 03 7/26/93 19 395
    127 1993 03 7/26/93 #NULL# 395
    127 1992 01 4/29/90 #NULL# 0
Chart402:PB_TR Prior Year Treaty Benefits article NOT CODED. However, Primary Ac
Chart402: PB_TR Combined limit is true.
    127 1991 01 4/29/90 #NULL# 0
Chart402:PB_TR Prior Year Treaty Benefits article NOT CODED. However, Primary Ac
Chart402: PB_TR Combined limit is true.
    127 1990 01 4/29/90 #NULL# 0
Chart402:PB_TR Prior Year Treaty Benefits article NOT CODED. However, Primary Ac
Chart402: PB_TR Combined limit is true.
Chart402:DC08 Prior Treaty benefits taken with this country but NOT within the T
Chart402:DC08 Prior Treaty benefits within the Student Article.
No Teacher/Researcher benefits allowed beyond 7/26/95
No Teacher/Researcher benefits allowed beyond 1994
Chart402-Pr04: Treaty benefits allowed under Teacher Article.
Chart402: Please note special rules for Japan travel expenses.
Chart402: Preparing form 8233 for Employment Services income
Chart3:DC13 Treaty does not include an article for Employees.
Chart2: Now Entering NoTreaty/No Benefit Routine
Chart2PG2: Preparing regular rules form W4
Chart2PG2:PR06 Students working on Campus are exempt from FICA
Chart2: Form 8843 already completed for 1994

*Fig. 10-2*

```
Residency:   Id=    127    Year   1990
Current Days        <      31.    NRA.
CL02:IRC_FIT and FICA  =          NRS
Dc0405:      Continuing Tax Resident.
DC0401:      Treaty found. Continuing.
Dc0403:      Tie Breaker Rule in effect.  Continuing.
```

SYSTEM AND METHOD FOR MONITORING INTERNATIONAL TAX STATUS

BACKGROUND OF THE INVENTION

This invention relates generally to a system and method for monitoring the US tax status of non-resident individuals, and in particular to an interactive knowledge based system for monitoring the combined effect of an individual's visa and travel activities, international tax treaties, and the presence or absence of potentially taxable income over specified periods of time.

Foreign students and scholars and foreign employees who come to the United States temporarily to study or work, may or may not be subject to Federal income taxation in the United States, depending on the type of income they earn while in the United States, the type of visa history they have (such as whether they are considered tax resident or not), the type of work activities performed and whether or not they can obtain the benefit of any international tax treaties that may be applicable to their situation. Institutions that employ or make payments such as fellowship or scholarship grants to such individuals need to comply with the applicable laws in order to withhold the appropriate amounts from payments to or on behalf of such individuals and file appropriate reports with taxing authorities.

Most institutions that have been faced with this problem try to deal with each individual on a case by case basis, but find this difficult to implement, if it can be done at all, given the institution's resources. A case by case analysis, however, is the approach suggested by the United States Internal Revenue Service.

While the United States has a "Model Treaty" it uses for international tax negotiations with other countries as a guide that might help standardize treaty terms, this does not contain provisions for teachers and only limited provisions for students. Thus, exemptions that might apply to these types of employees are developed during negotiations with a particular foreign country and, consequently, vary from treaty to treaty. Hence the reason why the IRS suggests the case by case approach.

In many cases, the treaty will have what is known as a "saving clause," a provision in most tax treaties negotiated with the US, which provides that the US reserves the right to tax its citizens and residents as if the treaty did not exist. This means that a critical determination for each individual (and the institution monitoring his or her tax status for withholding purposes) is whether the US considers the individual to be a resident for tax purposes. A resident alien for tax (but not necessarily immigration purposes) is one who had the right of legal permanent residence in the US or who passes the substantial presence test (the individual was present in the US for a specified minimum number of days.) Individuals who are thus deemed residents for tax purposes normally lose any treaty exemptions. However, some treaties have exceptions to this exception for teachers, researchers and students, so long as these individuals do not have status as lawful permanent residents. These exceptions are unique to each treaty.

In addition, the language of each treaty may be unique, so that an exemption that may be provided for teachers, for example, may not be available under that same treaty for researchers.

Further complicating the problem, some treaties also limit how much of an individual's income is exempt and for how long a time. These provisions, too, differ by treaty.

Individuals who come to the United States as students or researchers and stay for a while longer as teachers also need to be concerned about consecutive exemptions. Some treaties allow an individual to have consecutive exemptions without returning to the home country in between. However, many do not. In these latter cases, the individual may not be entitled to a further exemption unless he or she returns to his or her home country for at least a year.

In attempting to deal with this situation, the individual and the institution must understand the individual's residence status not only from a tax and tax treaty perspective, but from an immigration law perspective as well. While nonresident status protects foreign-source income from US tax, it is usually advantageous for most individuals whose primary source of income derives from US sources to file resident tax returns in the US.

For example, students present in the US with F,J, M and Q visa status are required by law to file taxes as nonresident aliens for their first five years in the United States. Visa subclassifications that authorize employment in the US are:

F-1—students and trainees in academic language programs. These individuals may work in a curriculum related job program or on-campus job and are exempt from FICA for the first five years, usually.

J-1—for students, trainees professors, research scholars and specialists—these may be employed in a curriculum-related job or on campus provided they comply with visa requirements. They are usually exempt from FICA withholding while they are nonresidents, usually two years.

H-1—for individuals of distinguished merit and ability to permit them to work at the sponsoring institution only. These holders are usually not exempt from FICA withholding unless they are covered by a US Social Security Totalization Agreement that provides otherwise.

M-1—for individuals who are students or trainees in vocational institutions.

Q-1—for workers engaged in practical training in cultural traditions and history, for example, to permit them to perform temporary services for the sponsoring institution.

Students who have been in the US since 1988 and who were present for at least 183 days in 1995 would probably qualify as resident taxpayers for the year 1995.

Nonstudents with J visas (professors, scholars, researchers, etc.,) are considered nonresidents for at least their first two post-1984 years in the US. H visa holders must files as nonresident aliens if they do not pass the substantial presence test.

There are three primary ways for qualifying for tax residence:

1. The substantial presence test. Nonimmigrants who hold other than an F,J, M or Q visa and can pass the test for the minimum number of days present and do not have a closer connection to a foreign country than to the US, may qualify. However, F,J, M and Q students and their dependents are not permitted to use the substantial presence test for at least their first five years in the US. Nonstudent J's and Q's may not use the test for at least two years. Holders of diplomatic/consular status or individuals employed by international organizations are also exempt from the substantial presence test—that is, they remain non-residents for tax purposes.

2. Married individuals may also become tax resident through certain elections. However, there are a number of provisions related to this, as well.

3. US Permanent Residency. Individuals must file as US residents if they have been given the legal right to reside permanently in the US, and this right is granted at the time of the final interview with the Immigration and Nationalization service (INS) even if the "green card" does not arrive for some time. However, individuals who obtain their "green card" overseas, are only taxed from the first day they enter the US, unless they meet the substantial presence test. Special "dual-status" rules apply to individuals who obtain permanent residence with fewer than 183 days remaining in the tax year and who do not pass the substantial presence test or otherwise qualify as tax residents for the full calendar year.

Institutions who employ or make payments to foreign students, teachers and scholars, are required to report to the IRS the amounts paid, and taxes withheld for employees or payees who are tax resident aliens, using standard W-2 and 1099 forms. If the institution makes payments, either through payroll or through a scholarship or fellowship office, to an individual who is deemed to be a nonresident for tax purposes, the institution is required to report some of those payments to the IRS on Form 1042S.

Whether an institution likely to employ or pay foreign students or scholars is a business corporation or a university, its payroll system is already extraordinarily complex. Most administrators of payroll systems today must be familiar with laws, rules and systems for topics as diverse as: the earned income credit, garnishments and levies, court-ordered child support, pre-and post-tax IRA contributions, restricted stock awards, deferred compensation plans, cafeteria benefit plans, equal employment opportunity laws, fair labor standards, work and student visas, social security and Medicare, shift differentials, group term life insurance, imputed income, tuition reimbursement, worker's compensation, ACH, OSHA, CODA, accelerated deposit rules, ADA, backup withholding, constructive receipt, de minimis fringe benefits, disability insurance, 401(k) plans, and so on. Most administrators are not familiar with the international tax treaties and their application, however, nor are most of them familiar with the intricacies of residency analysis, visa status review, exemption limits, and other factors that must be taken into account for foreign students, scholars and researchers.

Foreign student enrollment at educational institutions has risen from approximately 150,000 a year in 1970, to almost 450,000 a year in academic year 1993/94. Schools that may have had only a few hundred foreign students in 1970, may have as many as 2500 to 4500 (the range is taken from published data about the 20 institutions with the most foreign students in 1993/94.) Many of the treaties were first negotiated several decades ago, before the surge in frequent, relatively low cost travel by foreign students, scholars and researchers to and from the US. Even the Model Treaty used by the US is based on the OECD model treaty of 1977. Travel patterns then and now for foreign students, scholars and researchers are quite different. Travel patterns may even change the likelihood that a particular treaty will apply.

For example, a U.K. national who was tax resident in Belgium immediately before visiting the United States to teach would be covered by the treaty with Belgium, not the treaty with the U.K. Likewise, an individual may have been resident in a country with which the US has no tax treaty or a country with which the US has a treaty but lacking an article benefitting the individual. As an example of this, a citizen of France who has been living and working in Canada and who next comes to the US to engage in research would be covered by the treaty with Canada, not the treaty with France. Since the treaty with Canada has no treaty article benefitting researchers, the individual would be subject to US tax.

Thus, while it may have been feasible for a payroll administrator to deal with foreign students on a case by case basis, with appropriate help from the accounting, law, and other departments in 1970, it is impractical to do so at a school with an enrollment of several thousand foreign students in 1995, many of whom travel back and forth to this country and possibly other countries several times a year.

For each foreign student, scholar or researcher receiving payment or employment from the institution, the institution must determine if the person is to be treated as tax resident (US income is reported on form W-2 and 1099, individuals are taxed on worldwide income, may claim same deductions and exemptions as US citizens, and are subject to FICA withholding on their US income), or not tax resident (Individuals are taxed on most income from US sources, nonwage income is reported on Form 1042s, as are treaty exempt wages and salaries, but all other wages and salaries are reported on form W-2 and taxed at graduated rates based on a form W-4 submission—where only single marital status can be claimed, regardless of actual marital status and only one withholding allowance may be claimed (for most foreign students) and an additional $4.00 a week in withholding must be requested and exempt status under a treaty cannot be claimed)

AND

Scholarship and fellowship grants to nonresident aliens from a foreign source are not taxed, but US source grants are taxable, with a withholding rate of either:

14% on US source grant income if the nonresident is a degree candidate present in the US under and F-1, J-1, or M-1 or Q-1 visa, and the portion received for tuition expenses is exempt, or 30% if the nonresident is a non-degree candidate and the grant was not made for study training or research at a US institution or was not made by a tax-exempt organization, a foreign or federal, state or local government agency or an international organization,

AND

FICA withholding for the nonresident is based upon the substantial presence test, applied in calendar years, not academic years.

While it may often be advantageous for an individual to file as US tax resident, there are time it may be desirable to retain nonresident status, if possible, since resident aliens are taxed on total worldwide income. Nonresident status may be advantageous if an individual is to protect foreign-source income, such as a home-government scholarship which could be taxable. However, an individual may not choose between resident and nonresident status for tax purposes, as it is determined as a matter of law. A part of the legal determination is based on the terms of any applicable treaty.

Tax treaty provisions generally take precedence over the substantial presence test in determining residence for tax treaty purposes. A wide range of tax exemptions and reductions are available to residents of treaty countries who are temporarily in the US while engaged in qualifying activities. For example, some individuals may be considered as residents of the US under IRS definition and residents of their home country by virtue of tax treaty provisions. This "dual resident" status permits qualifying individuals to claim nonresident status for purposes of income covered by tax treaty, yet be treated as residents for all other purposes of the US tax law.

The problem facing foreign students, scholars, employees and their US institutions in monitoring tax status is formidable. Interpretations of tax treaties and their applicability to an individual require in-depth legal and analytical skills.

Since the 1950's, the United States has entered into tax treaties with other countries that define mechanisms to avoid double taxation of the same income, and procedures for cooperating with each other to resolve tax disputes, enforce compliance and exchange tax information. The bilateral treaties entered into by the US typically cover how each country's residents are taxed and what is taxable income, and include definitions of residence , the scope of the power to tax, and specific exemptions from taxation that may apply. Most tax treaties grant each country broad interpretive powers to the competent authority in each country, if questions arise about the meaning of a provision.

US income tax treaties are negotiated by the Treasury Department and the Treasury Department issues Treasury explanations as official guides to the treaties. Treaties have the same effect as acts of Congress. Under US law, if the terms of a treaty conflict with a US statute, the more recently adopted of the two may prevail, if it is otherwise deemed constitutional. The Treasury Department does not provide detailed regulations for the application of individual income tax treaties, however the Treasury explanations, the Report of the Senate Foreign Relations Committee on the treaty and occasionally, discussions of the treaty on the Senate floor are all used as guides for interpretation of the treaty.

In some cases, a Treasury explanation draws upon US IRS rulings and decisions on the application of treaty provisions.

The US is a party to more than 40 income tax treaties with other countries. Some of these were negotiated before the OECD (Organization for Economic Cooperation and Development) Model treaty was first published in 1977. The treaty with the former Soviet Union covers the CIS member countries that have not yet negotiated new treaties.

Most treaties:

include a saving clause (giving the US the right to tax its residents and citizens as if the treaty did not exist);

define what income is taxable;

define tax resident; and, in the case where the United States' definitions of resident conflict with those of the other country, include a tie-breaker rule for determining treaty residency when an individual is a resident under each country's internal law.

The treaty with Indonesia illustrates a form of a tie-breaker rule. Under it, the first test is whether the individual has a permanent home, e.g. where the individual resides with his or her family. If the person has a permanent home in both countries or in neither of them, he or she is deemed to be a resident of the country with which the individual's economic relations are closer. If that is inconclusive, the deciding factor is where the person has an habitual abode. If the individual has an habitual abode in both countries or in neither of them, the person is deemed to be a resident of the country of which he or she is a citizen. If citizenship fails to assign a single residence, the competent authorities are charged with settling the issue.

Even when the most recent version of the model treaty is used as the basis for negotiations, each treaty is negotiated and each one may have terms that differ from all the others. Treaties are also subject to expiration and renegotiation. In addition, changing national circumstances (such as the dissolution of the USSR) may require additional analysis to determine what, if any, treaty applies.

In order to perform a reasonable case by case analysis of the tax status of a given foreign student, scholar, or researcher, for example, one or more knowledgeable people need to determine:

the individual's status as tax resident or not tax resident, based on the individual's visa and travel history for as far back as the last 6 years, (or more), applying not only Immigration and Naturalization (INS) laws but also IRS rulings, as well as any applicable tie-breaker provisions of any applicable tax treaties;

whether any tax treaty applies (if an individual is a citizen of one country, had been a tax resident of a third country, and is now in the US, one of two or more treaties may apply);

whether any exemptions in any treaty apply to this individual, given this individual's residence status and primary activity in the US;

whether any taxable income exists;

what forms must be used to report and claim the results of the above, both by the individual and by the US institution making payments to him or her.

Each of these may involve a number of additional complex analysis steps. In determining whether any taxable income exists, for example, most treaties also distinguish between income from "independent" and "dependent" services. Income from "independent" services is more commonly known as self-employment income. Many treaties incorporate the rule that an individual who is a resident of a treaty country and who derives income from self-employment in the US will be exempt from US federal tax in respect of that income unless certain conditions are satisfied. These vary by treaty. They may include rules about having a fixed base, or spending a certain number of days in the US, or a minimum amount of self-employment income or some combination of these.

As another example, the saving clause in some treaties may have an exemption for a student at "a recognized" educational institution. Experts in treaty analysis and interpretation know that this usually means an accredited institution, not merely one that is known for offering classes, such as a vocational school. However, those who rely on the ordinary meaning of the word could be misled. While treaty documents are US government works that are not protected by copyright, it is not easy to obtain copies of them without subscribing to costly update services. When copies are available, they are usually published in full, leaving to the experts to find the relevant articles of each treaty which may or may not confer benefits.

Consequently, the person or persons who analyze tax status for institutions should be expert in US tax law, international tax treaties, and US Immigration and Naturalization Law, and have or have access to all the update services necessary to stay current in these areas. Since most institutions do no have one or even several people on staff who have the required specialty knowledge, it may take outside consultations with one or more experts, for each foreign individual. This can be very costly for the institution or the individual or both. As a result, at least one published study from November/December 1994 shows that the level of noncompliance is estimated to be quite high.

In that study, at least half of all foreign students failed to file a US return when they should have, and of those who filed, many filed the wrong form. Both the students and the institution can face liability and penalties for noncompliance, and students who might be eligible for a number of tax treaty benefits may fail to claim them. Students from the countries under study averaged an overall noncompliance rate of 95%. However, this apparently did not cause a loss of revenue to the US, since many of the noncompliant students overpaid US taxes, by failing to claim applicable treaty benefits. Another study shows that some educational institutions may have tax liabilities in the six figures, as audits show that inadequate withholding and reporting of foreign tax status occurred.

Individuals who fail to file tax returns correctly or who have been issued payor documents incorrectly may encounter significant tax penalties and costs from the failure to file and pay appropriately. It has been reported in one study that institutions and individuals who are noncompliant usually have not refused to comply, but simply find it extremely difficult and complicated to do so.

Ideally, an institution that employs or pays foreign students, professors, and researchers, needs to be able to make all the proper determinations about tax status and withhold taxes and file reports accordingly. For an institution with thousands of foreign students, from some of over 40 or more treaty countries, where each student could be on one of 8 or 9 different types of visas, and may or may not have US or foreign source income and may have any number of permutations and combinations of travel history to and from the US per individual, per year, this is not a simple task to do once, much less on an ongoing basis as treaties and laws change, visa status per individual changes, and so on.

Ideally, an individual foreign student, scholar or researcher with potentially taxable income, needs to understand what, if any benefits may be available under applicable tax treaties.

However, attempts by institutions to create computerized payroll or tax analysis systems to handle this involve the further complication of requiring familiarity with systems analysis and complex programming skills, in addition to all the tax law, international tax treaty law and immigration law skills. Conventional mainframe payroll systems to address this problem could cost hundreds of thousands of dollars to develop, and possibly just as much to maintain, if they were deemed feasible to do. Conventional payroll systems work best at handling clear-cut distinctions, such as computing a withholding amount and subtracting it from gross salary, not the constantly changing, subject-to-interpretation environment of international tax treaties, where the question is more likely to be knowing whether any withholding applies at all.

The programming task is complicated even further by the fact that the tax laws and tax treaties generally work on a fiscal year that is the same as the calendar year for determining presence and benefits, while most institutions that employ or pay foreign students and scholars operate on an academic year basis, usually September or October through May or June. Some treaties base physical presence tests on a 12-month consecutive period rather than a calendar year. Many treaties also impose time limits for exemptions. Some of these may be fixed terms, such as 5 calendar years, or they may be defined as the "period" reasonably necessary to complete the education or training. For most undergraduate or college degrees, this period would be 4 years, but for advanced degrees the period might be longer, such as 7 years for medicine. In some cases, an exemption can be lost retroactively if a time limit is exceeded. For example, the U.K. treaty provides that if a person comes to the US for the purpose of teaching, his or her two year exemption from tax will be lost if the person exceeds the 2 year period in the US. The complexity of such time determinations and conversions from fiscal year to calendar year, or academic year, or 12-consecutive months, or "reasonable" period, makes visa history, and computations involving the substantial presence test somewhat daunting.

As further examples, F-1, J-1, M-1 and Q-1 visa holders who are students are exempt from the substantial presence test for five calendar years. But for this purpose, presence in the US for any part of a year is considered presence for that entire calendar year. Thus, a foreign student attending college in the US for four typical academic years would be present for five calendar years.

In another example, J-1 visa holders who are non-students, such as professors researchers and specialists, are exempt from the substantial presence test during the first two calendar years they are in the US as nonresidents. If a J-1 nonstudent holder was exempt from the substantial presence test for any two of the last six years, the individual must compute the substantial presence test for the current calendar year. However, if the J-1 nonstudent holder is paid from a foreign source, he or she must compute the substantial presence test in the current year only if he or she has been exempt under a J-1 visa for any part of four of the previous six years.

If the foreign student, scholar or researcher is from a country with which the US has renegotiated an existing treaty in the last few years, it is also possible that the terms of both the old and the new treaty must be analyzed in conjunction with the individual's travel and visa history over the last 6 or 7 years. Generally, when an old treaty is replaced by a new treaty, a resident of a treaty country has two options. The individual can elect to have the old treaty apply in its entirety for the first year in which the new treaty is effective, if the old treaty results in greater relief from tax. Alternatively, the individual can claim benefits under the new treaty.

Individual foreign students and scholars may need to overcome language, custom and legal system differences to be able to obtain the benefits they are entitled to by treaty and law. In the study of noncompliance mentioned above, it was estimated that the average foreign student's tax liability was about $2,000. If the student has to consult a professional, such as an accountant, tax attorney or immigration law attorney, to understand his or her status, the cost of consultation could easily consume almost the same amount of money, thus negating any treaty benefits that might apply. Professionals who are very experienced in the area might be able to do the analysis in 45 minutes to an hour. However, most accountants, tax attorneys and immigration attorneys, are not familiar with tax treaties. Most accountants do not now maintain up to date treaty resources because of the costs involved. It could take as much as 6 to 8 or more hours for such skilled professionals to research the proper treaty and interpretations, make the determinations and explain them to the individual. At an estimated average fee of $150 an hour, this could cost the student $900 to $1200 or more.

Similarly, institutions with 2500 or 4500 foreign students might find even the experienced professional's one hour per student too costly. At an average fee of $150 an hour, again, multiplied by the number of students, the cost could be $375,000 to $675,000 or more, each year. At the same time, if the institution is not withholding the proper taxes, it could be liable for them. The IRS has stated that the adjustment resulting from audits of institutions in these areas has cost the institutions from $30,000 to $250,000. In one case, where an institution misclassified employment income as scholarships and fellowships, the adjustment contributed significantly to a $50 million liability. If most of the students are eligible for treaty benefits, and file appropriate returns so indicating, the liability risk for the institutions can be lowered considerably—both individual and institution benefit.

If neither the individual nor the institution can afford to hire the experts or design complex systems to do the analysis, then they are both faced with a financial dilemma. Incorrect filing and withholding (or lack thereof) is costly, but the individual or institutional ways of determining the proper amounts with traditional consultants or systems can cost almost as much as incorrect compliance.

It would be desirable to have a system for automating the process of monitoring tax status for foreign individuals that does not require costly new mainframe computer payroll program systems or major modifications to existing ones.

Given the variety and changing nature of international income tax treaties, a system that could be modified as the treaties, laws or interpretations change would be beneficial for institutions and students and tax authorities.

If a relatively inexpensive system for monitoring international tax status could be made widely available to foreign students, scholars and researchers, the benefits of treaty benefits both governments intended they should get would be much more likely to be available to them to claim.

For institutions, who cannot afford major new systems, nor costly specialist advisors for foreign students, scholars and researchers, a relatively inexpensive system for monitoring international tax status and indicating which forms should be filed, would not only help the individuals, but could significantly lower the institution's risk of tax liability.

SUMMARY OF THE INVENTION

These and other objects of the present invention are achieved by an interactive knowledge based system having a residency status analyzer and a tax treaty analyzer that cooperate to determine the residency status of an individual, based on the individual's visa history, travel to and from the US, and the applicability of any treaty for the individual. The residency analyzer evaluates visa history, travel and days in the US, as well as type of activity and any applicable treaty's tie-breaker rule to determine if residency status is affected and sets indicators accordingly. The tax treaty analyzer performs an income type analysis to determine if income is from employment services, self-employment, or scholarship and fellowship grants. The tax treaty analyzer evaluates the applicable treaty for the presence and terms of a saving clause. For each type of income, the Tax treaty analyzer determines whether treaty benefits are available for the individual based on the primary activities of the person, and the person's residency status. Results are displayed interactively and also sent electronically to several output files and formats, including appropriate tax forms, files to be sent to an institution's payroll system, and audit trails.

It is an aspect of the present invention that it automates the residency and international tax analysis for a foreign national student, scholar or researcher.

Another aspect of the present invention is that it analyzes withholding requirements for a foreign national and completes the appropriate IRS withholding forms.

Still another aspect of the present invention is that it identifies applicable tax treaties and benefits available to an individual who is a foreign national.

Yet another aspect of the present invention is that it creates audit reports and tax status report forms.

A feature of the present invention is that it maintains the individual's visa history.

A further aspect of the present invention is that it can be customized to allow interdepartmental sharing of data for IRS compliance purposes.

It is another feature of the present invention that it includes text from relevant tax treaty articles.

It is yet another aspect of the present invention that it is implemented on relatively inexpensive personal computer systems, and can electronically provide information to and collect information from more complex mainframe payroll systems at an institution.

Still another aspect of the present invention is that it is modularly structured so that new expert knowledge about treaty terms, tax rulings, immigration laws and other changes and interpretations can be added or changed easily.

Yet another aspect of the present invention is that it eliminates the need for major revisions to an institution's payroll systems to monitor tax status for foreign nationals.

It is a feature of the present invention that is can be used interactively by the foreign national or by administrative personnel, as the user desires.

Still another feature of the present invention is that it can also be used in a networked, client/server environment, where several departments use it to monitor and update and share status about the foreign nationals in their departments, as requested by IRS rulings and advisories.

BRIEF DESCRIPTIONS OF THE DRAWINGS

Figure 1:
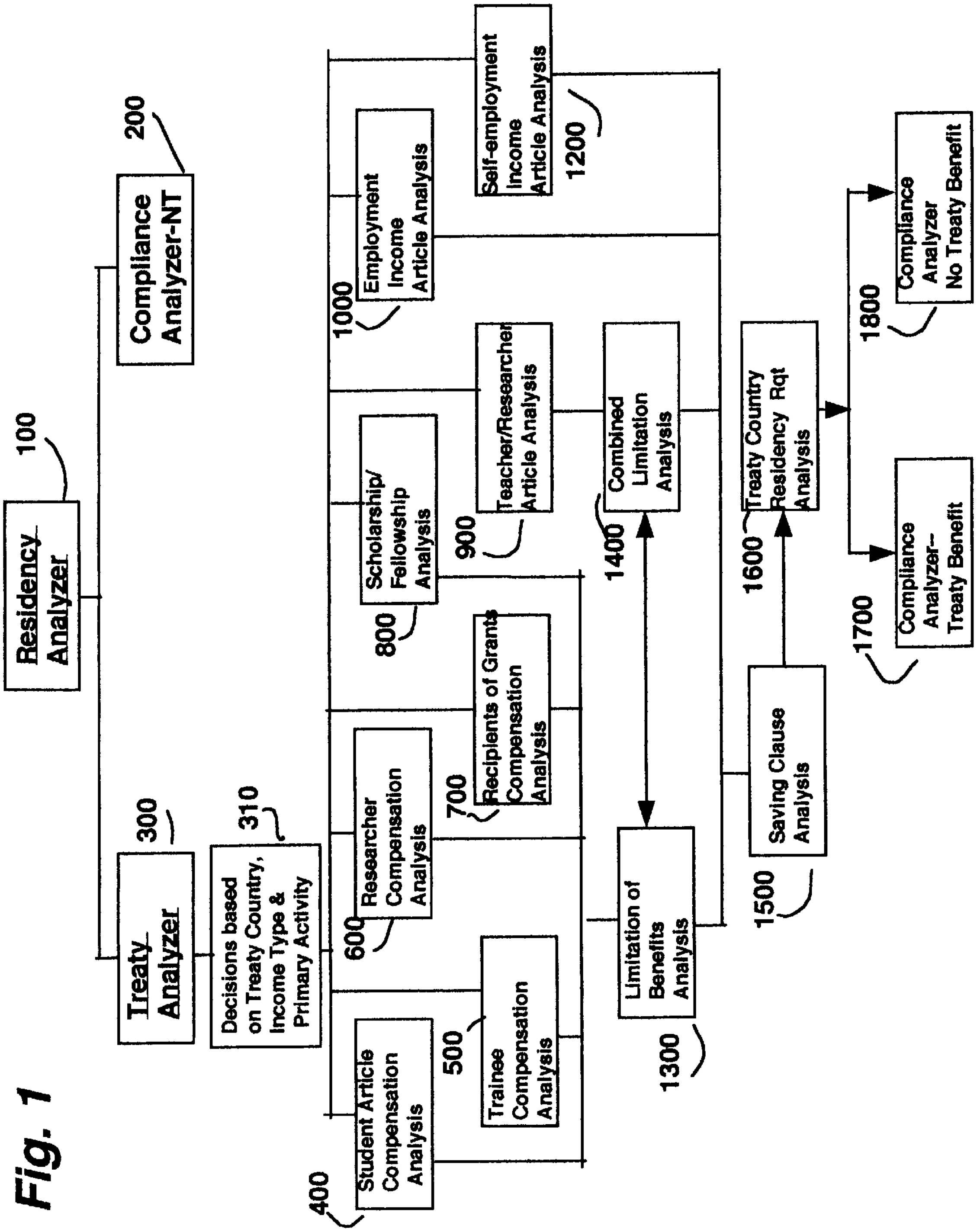
FIG. 1 is a schematic overview flow diagram of the present invention.
Figure 2:
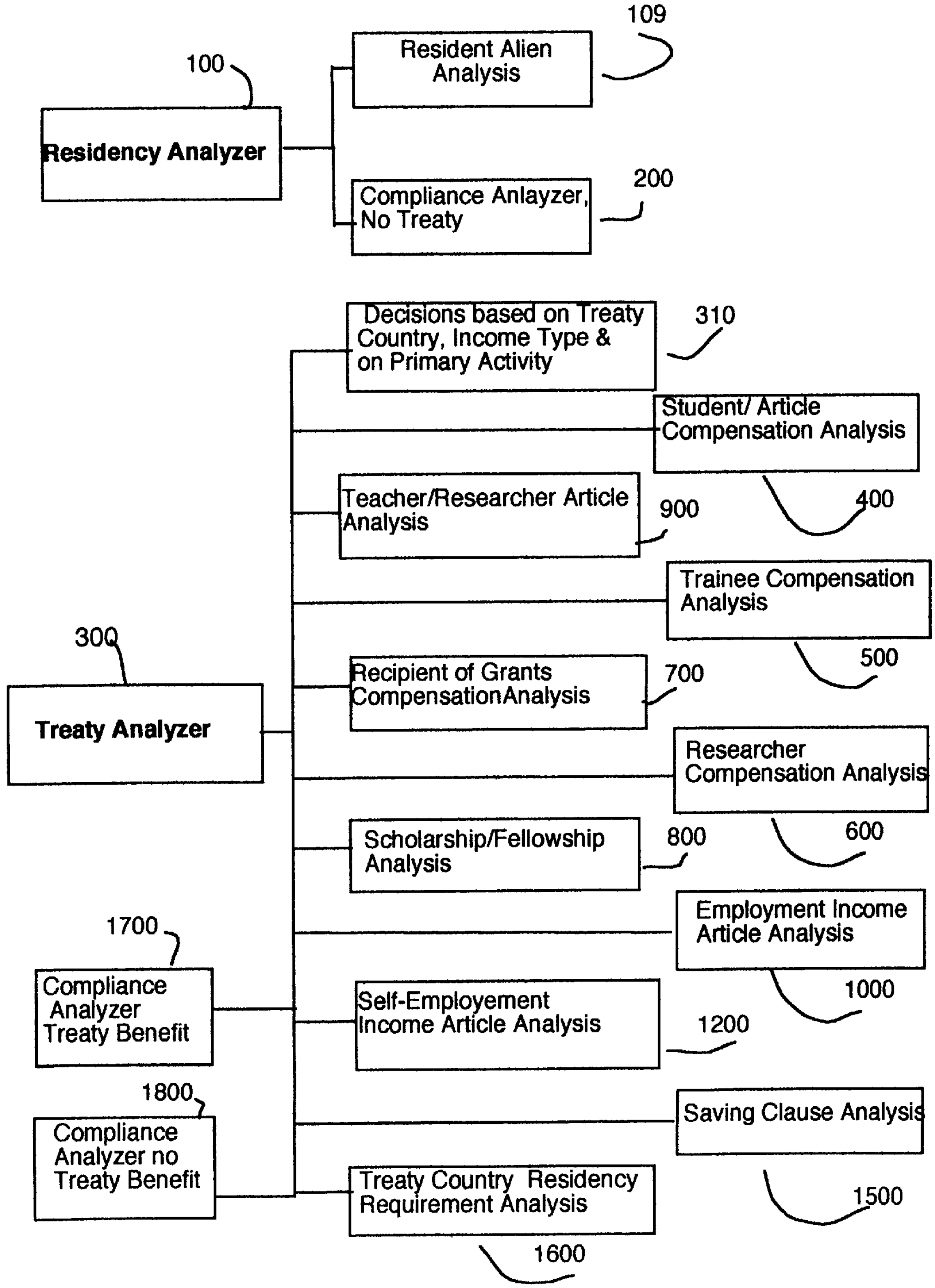
FIG. 2 is a block diagram of the principal knowledge based analyzers of the present invention.

FIGS. 4A1 and 4A-2 are part of a country table according to the method and apparatus of the present invention.

FIGS. 4B1 and 4B2 are part of a country table according to the method and apparatus of the present invention.

FIGS. 4C-1 and 4C-2 are part of a country table according to the method and apparatus of the present invention.

FIGS. 4D-1 and 4D-2 are part of a country table according to the method and apparatus of the present invention.

FIG. 4E is part of a country table according to the method and apparatus of the present invention.

Figure 5A:
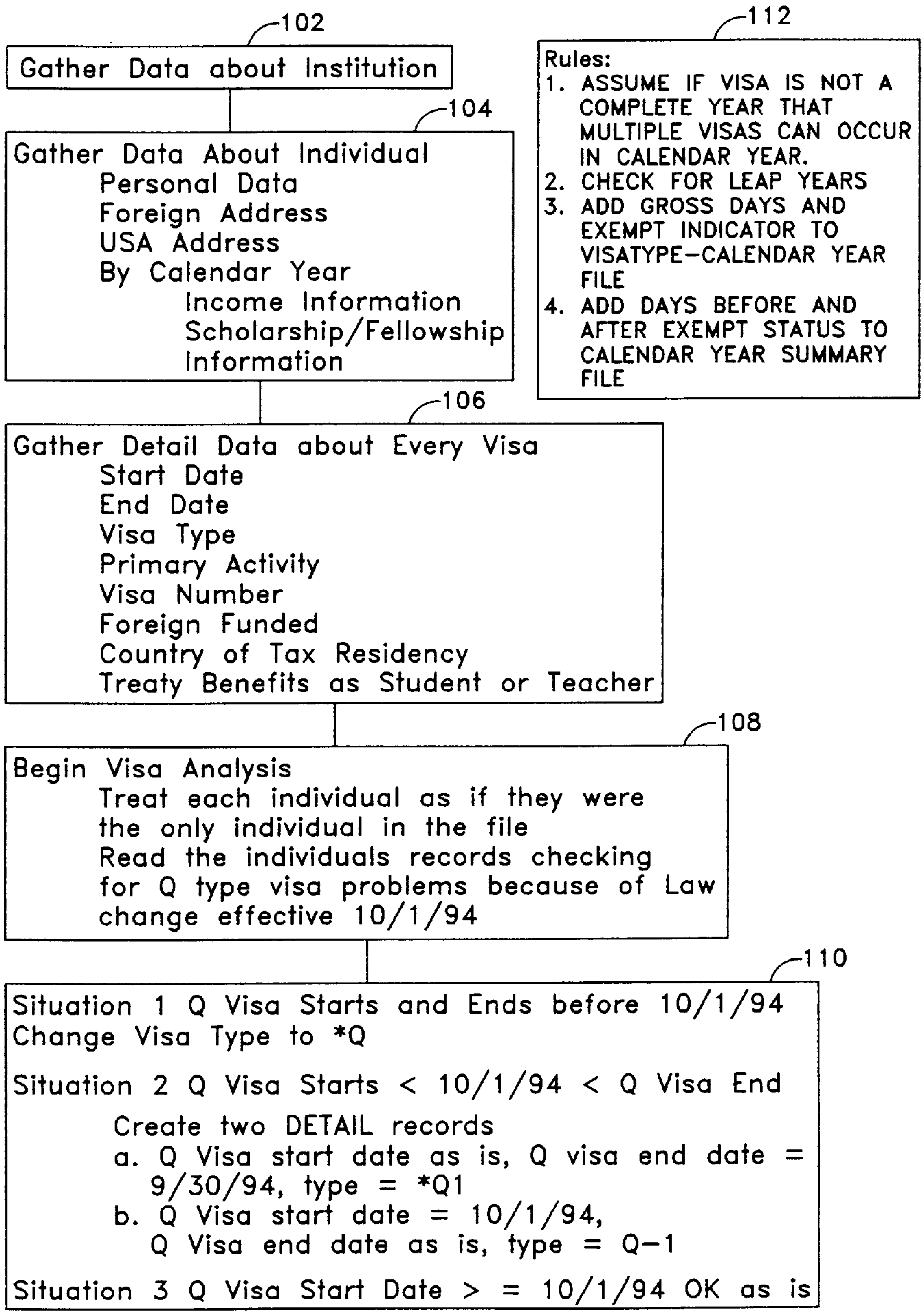

FIG. 5A is a block diagram of parts of the residency analyzer of the present invention.

FIG. 5B is a descriptive overview of the flow of part of the residency analyzer of the present invention.

FIG. 5C is a descriptive overview of the exempt day analysis and combining routines of the present invention.

Figure 5D:
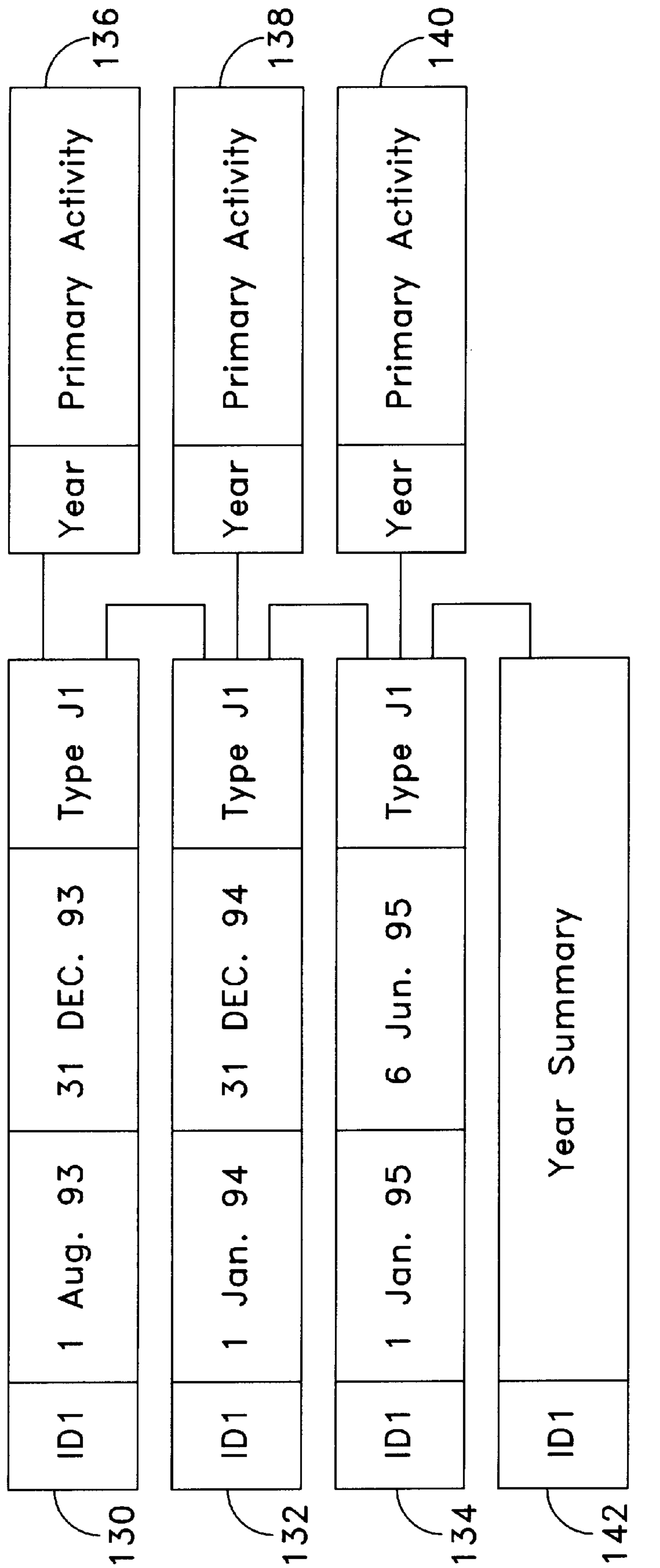
Figure 8A:
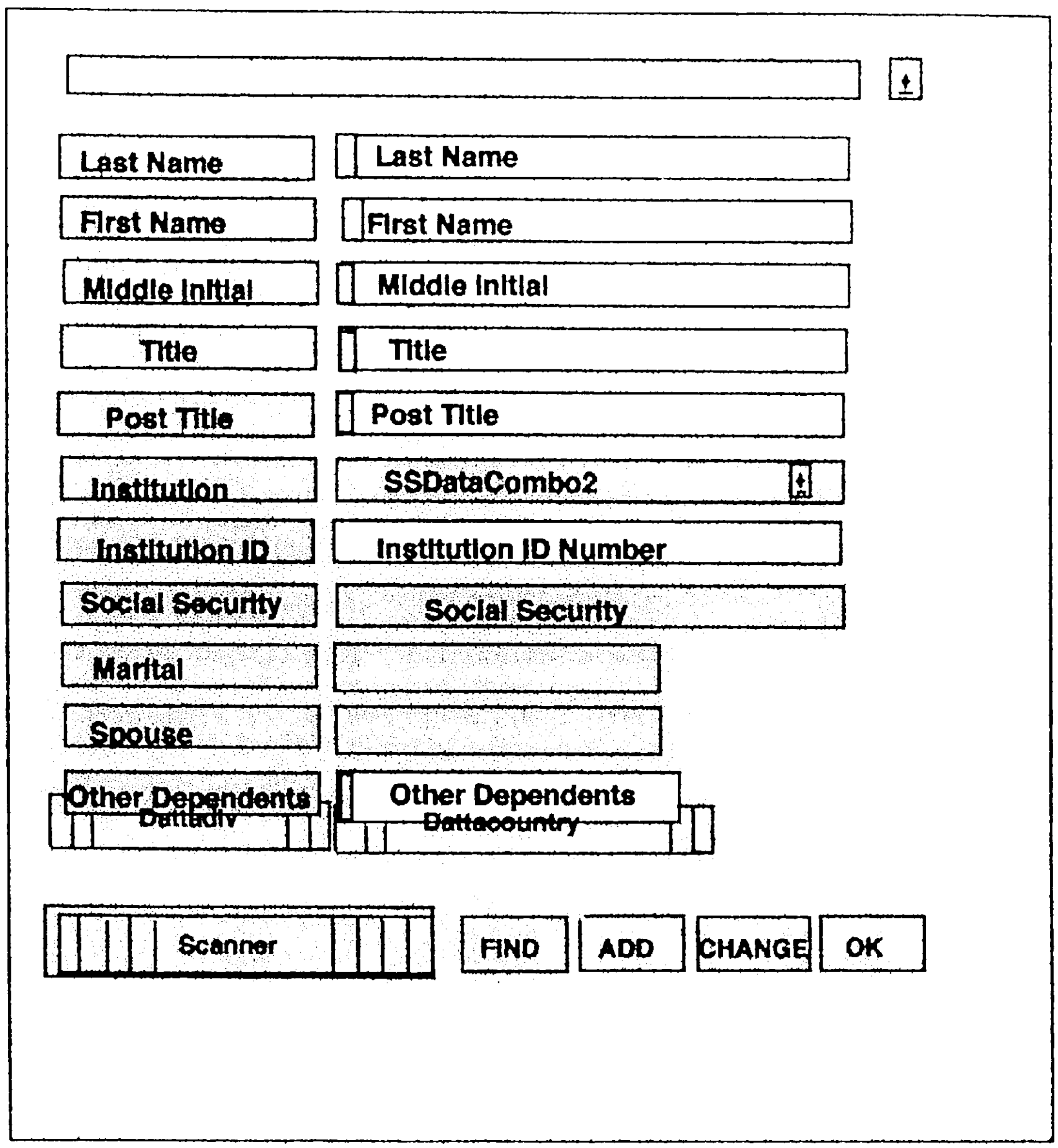
Figure 8B:
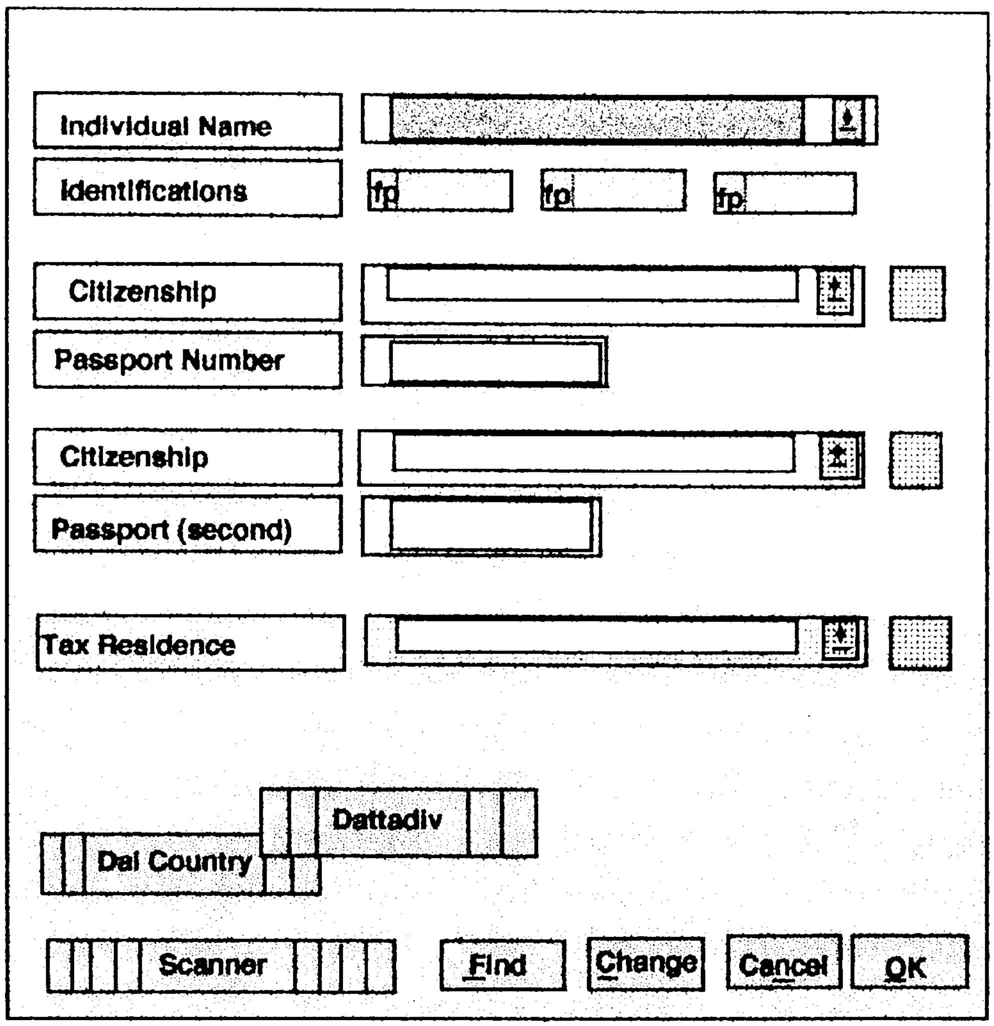
Figure 8C:
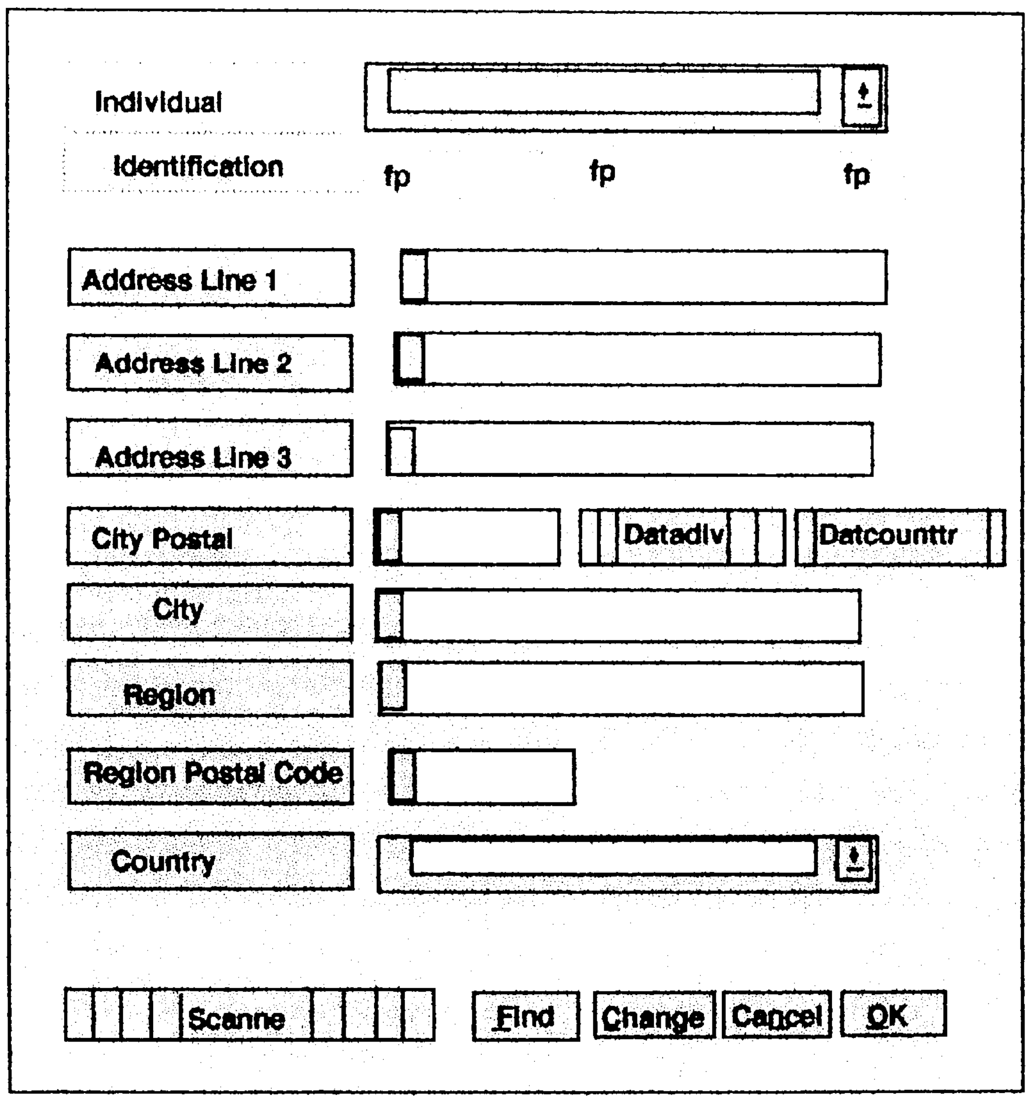
Figure 8D:
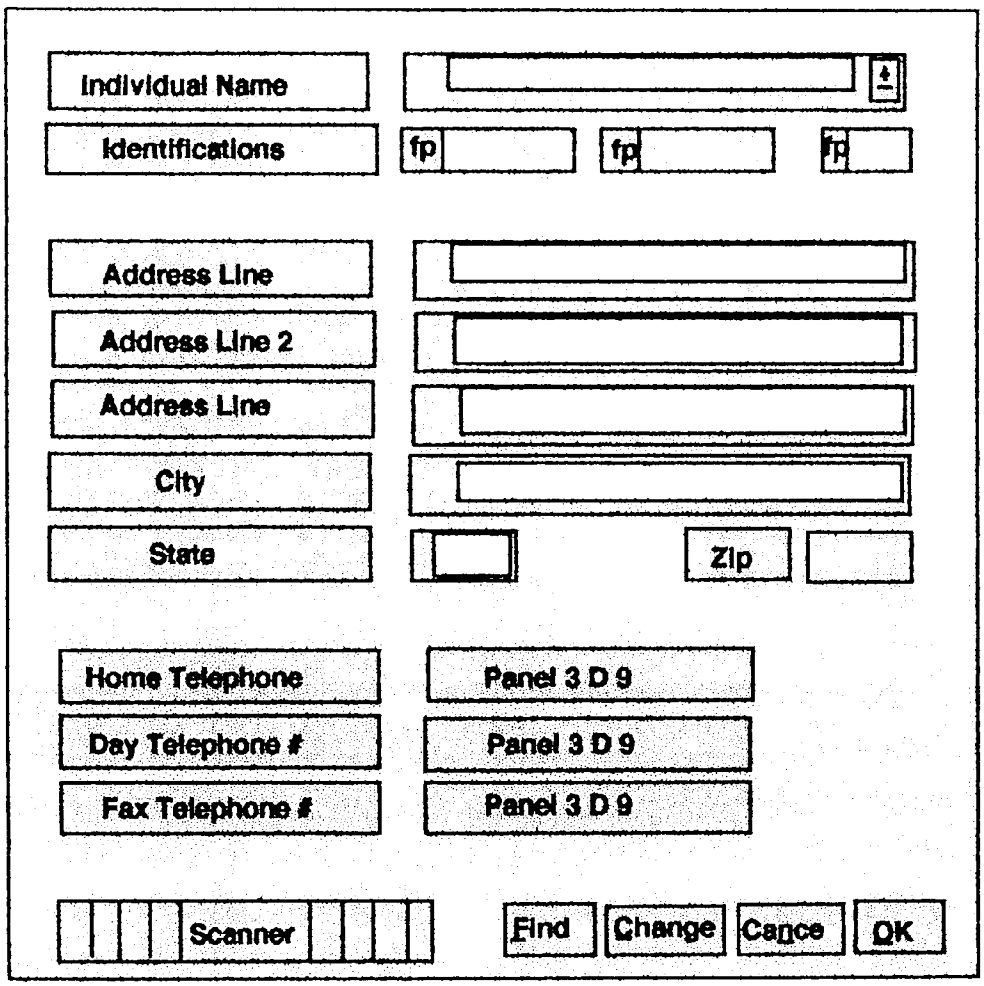
Figure 8E:
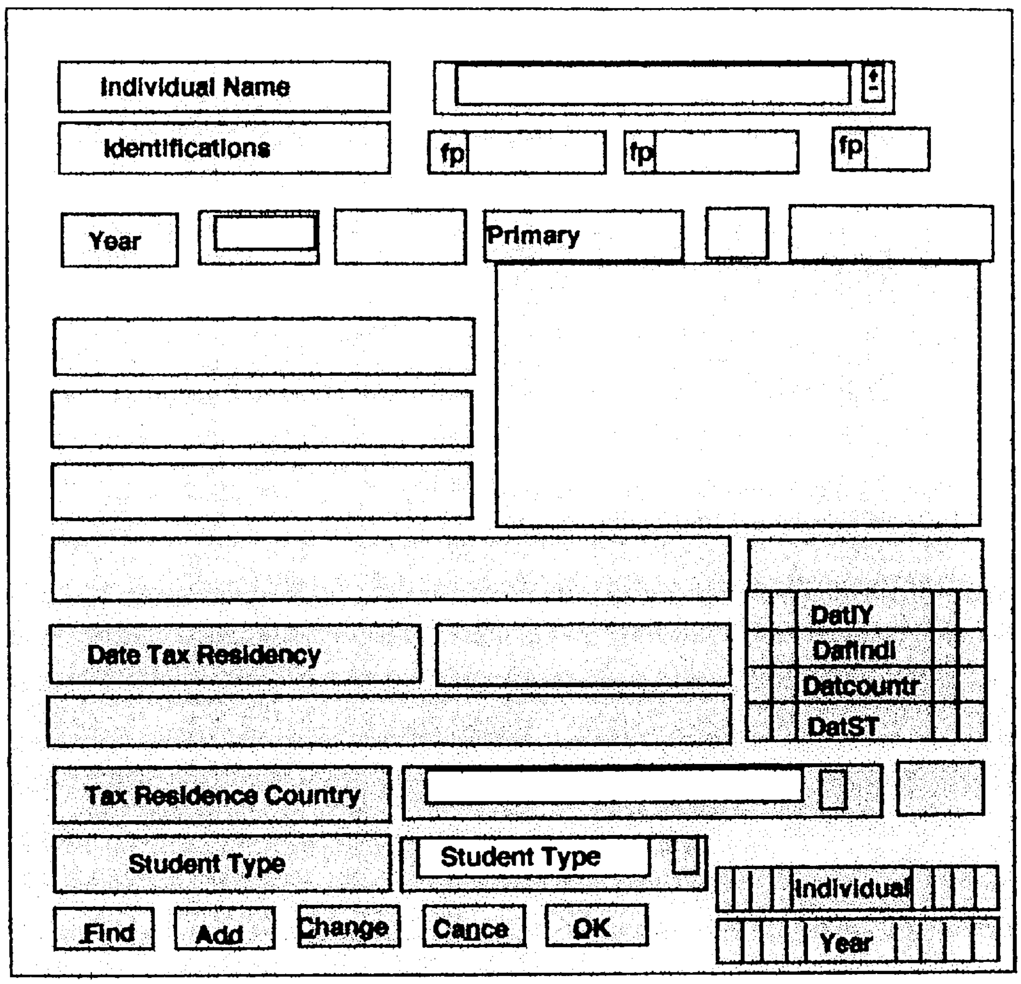
Figure 8F:
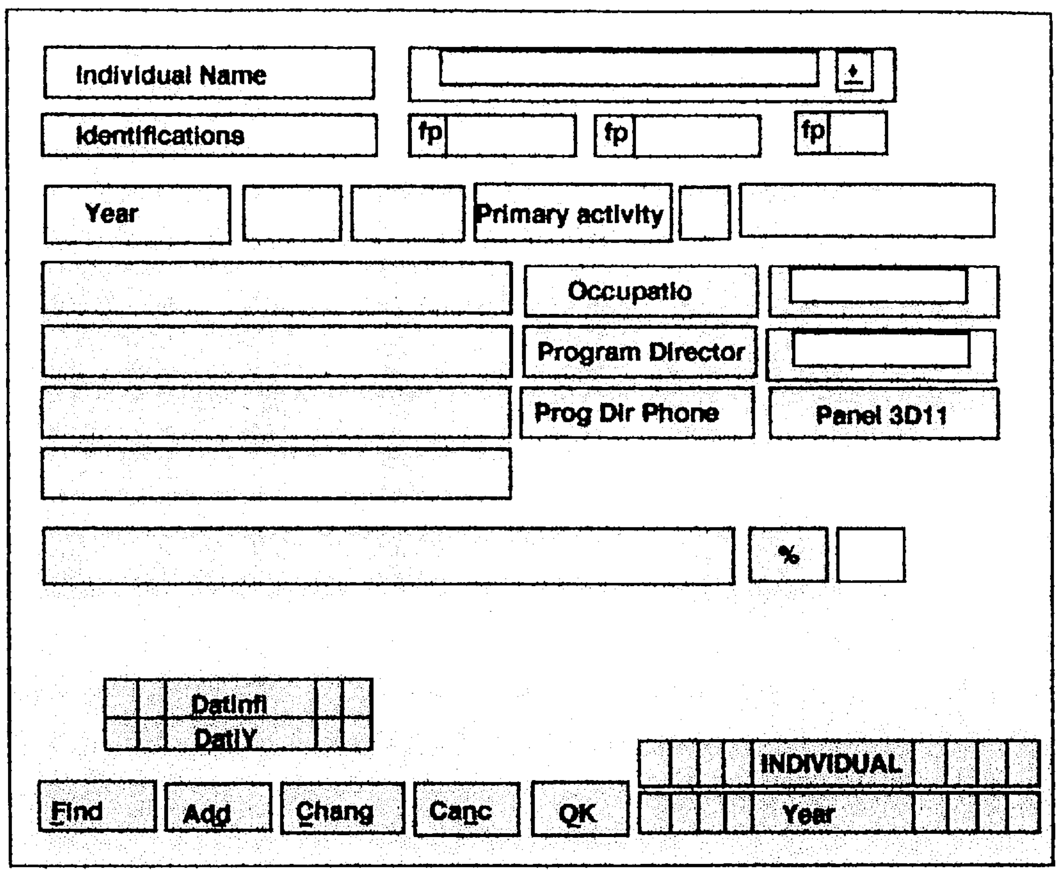
Figure 8G:
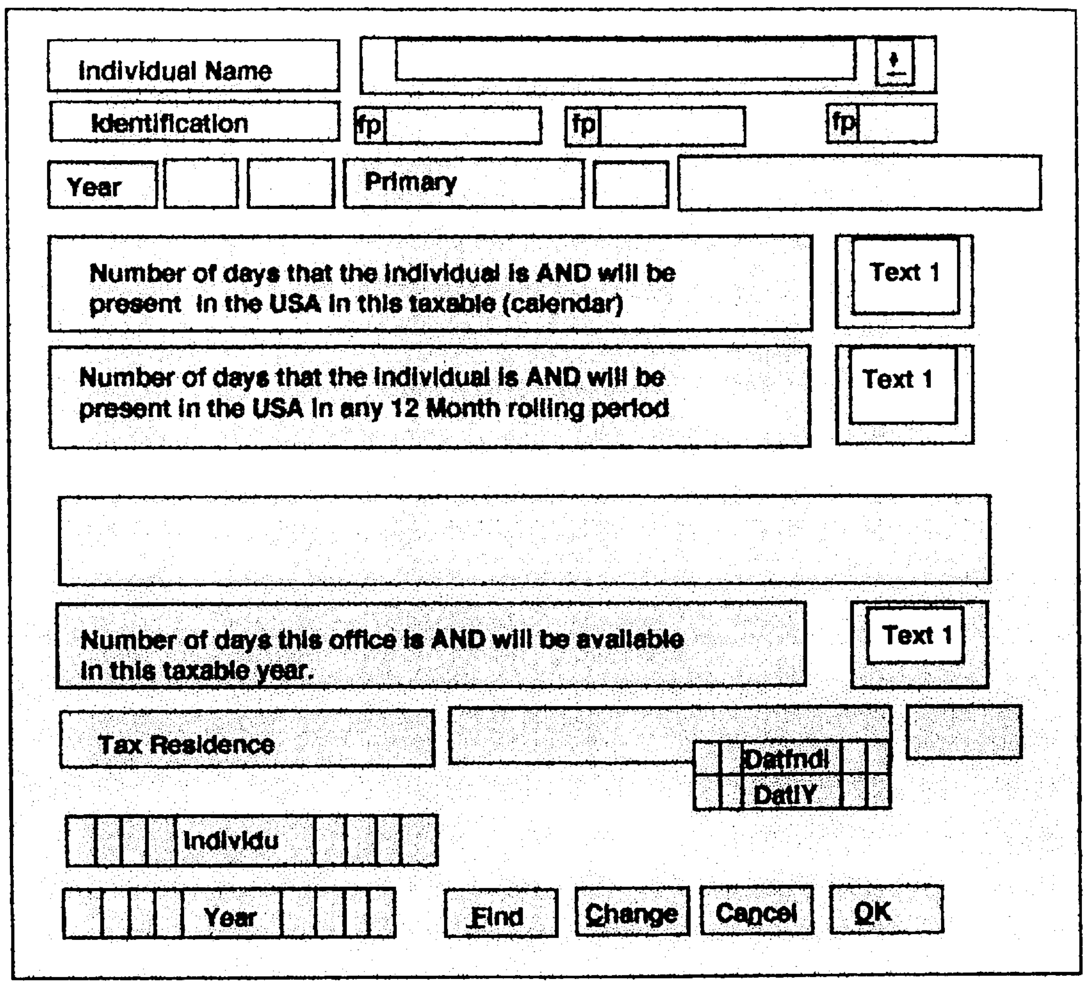
Figure 8H:
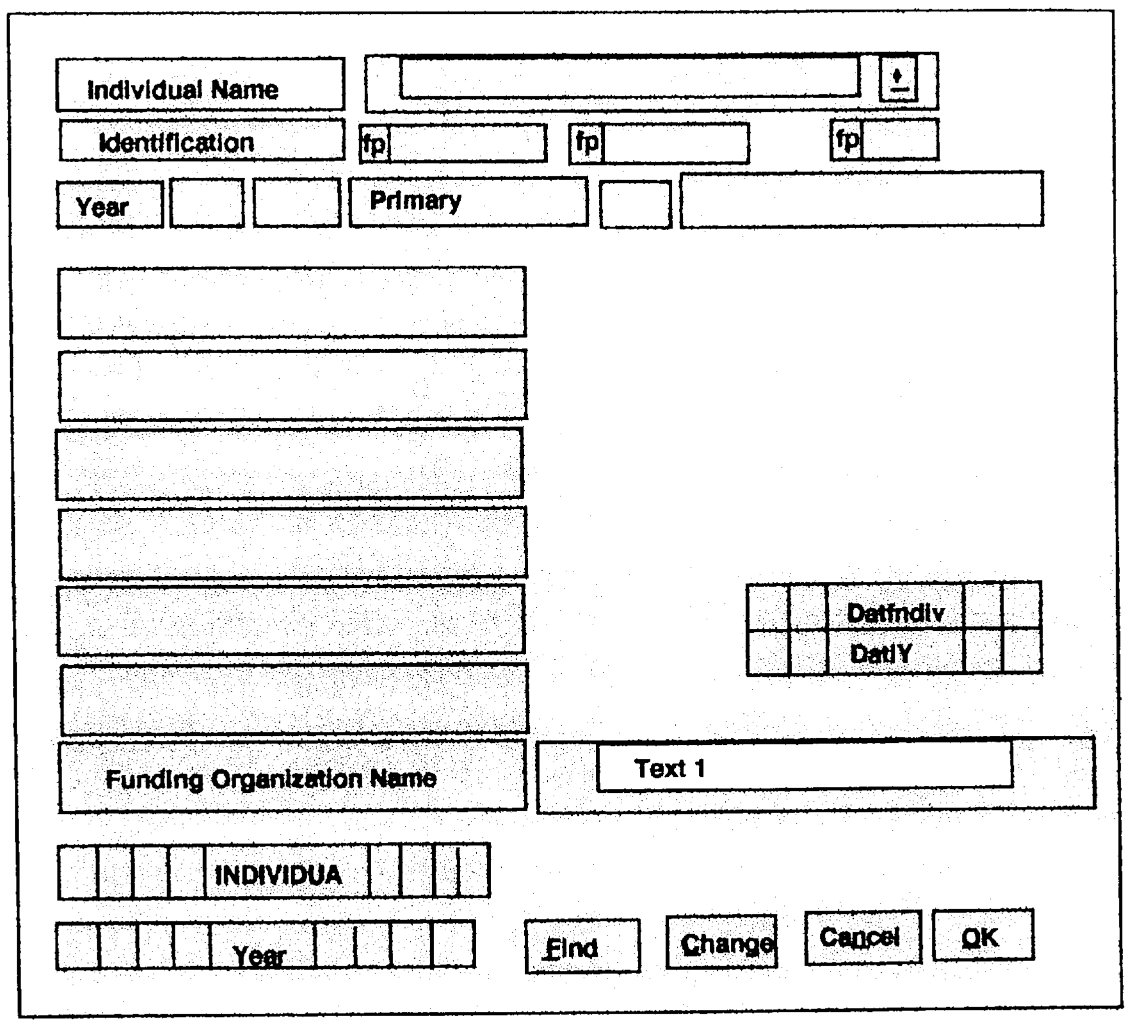

FIG. 5D is a schematic view of records created during residency analysis according to the method and apparatus of the present invention.

FIGS. 6A-1 and 6A2 are part of a treaty table according to the method and apparatus of the present invention.

FIGS. 6B-1 and 6B-2 are part of a treaty table according to the method and apparatus of the present invention.

FIGS. 6C-1 and 6C-2 are part of a treaty table according to the method and apparatus of the present invention.

FIGS. 6D-1 and 6D-2 are part of a treaty table according to the method and apparatus of the present invention.

FIGS. 6E-1 and 6E-2 are part of a treaty table according to the method and apparatus of the present invention.

FIGS. 6F-1 and 6F-2 are part of a treaty table according to the method and apparatus of the present invention.

FIGS. 6G-1 and 6G-2 are part of a treaty table according to the method and apparatus of the present invention.

FIGS. 6H-1 and 6H-2 are part of a treaty table according to the method and apparatus of the present invention.

FIGS. 6I-1 and 61-2 are part of a treaty table according to the method and apparatus of the present invention.

FIGS. 6J-1 and 6J-2 are part of a treaty table according to the method and apparatus of the present invention.

FIGS. 6K-1 and 6K-2 are part of a treaty table according to the method and apparatus of the present invention.

FIG. 7A is part of a form set for providing input to the present invention about the foreign national.

FIG. 7B is part of a form set for providing input to the present invention about the foreign national.

FIG. 7C is part of a form set for providing input to the present invention about the foreign national.

FIG. 7D is part of a form set for providing input to the present invention about the foreign national.

FIG. 7E is part of a form set for providing input to the present invention about the foreign national.

FIG. 7F is part of a form set for providing input to the present invention about the foreign national.

FIG. 7G is part of a form set for providing input to the present invention about the foreign national.

FIGS. 8A through 8H are screen prints of interactive screen displays according to the method and apparatus of the present invention.

FIG. 9 is a residency analysis report generated according to the method and apparatus of the present invention.

FIGS. 10-1 and 10-2 are a treaty analysis log generated according to the method and apparatus of the present invention.

DETAILED DESCRIPTION OF THE INVENTION

In a preferred embodiment of the present invention, as shown in FIG. 1, a residency analyzer 100, takes information about the foreign national (FN) individual's visa type, visa history, work activity, and travel to and from the US, to determine whether the individual is to be treated as a US resident, for tax purposes, or as a nonresident. If the individual is not from a treaty country, compliance analyzer—no treaty 200 prepares reports for the individual's tax compliance treating the individual as a resident for US tax purposes.

If the individual is from a treaty country, treaty analyzer 300 is activated. Decision Analysis 310 reviews the individual's residency records, created by residency analyzer 100, for treaty country, income type, and primary activity(s). Based on these decisions, one or more analyzers are invoked to perform compensation analysis. For example, if the individual has a student visa or has listed study as a primary activity, the student article compensation analysis 400 is done. Similarly, if applicable, researcher compensation analysis 600, trainee compensation analysis 500, recipient of grants compensation analysis 700, scholarship/fellowship analysis 800, teacher/researcher article analysis 900, employment income article analysis 1000, or self-employment income analysis 1200 are executed for the individual. For students, trainees, researchers, and recipients of grants, scholarships or fellowships, a limitation of benefits analysis 1300 is performed. For those who qualify for teacher or researcher benefits, a combined limitation analysis 1400 is performed.

Still in FIG. 1, saving clause analysis 1500 is done to set indicators related to the applicable treaty(s)' saving clause or lack thereof, and a treaty country residency requirement analysis 1600 is then performed. At this point, the individual will either have been determined to have treaty benefits that can be claimed, or the determination will be that he or she is not entitled to claim them. For those who may claim benefits, compliance analyzer—treaty benefit 1700 is executed to prepare the appropriate forms and reports and transmit them electronically to files or other systems. For those who are not eligible to claim benefits, compliance analyzer-no treaty benefit 1800 prepares the appropriate forms and reports and transmits them electronically to files or other systems.

Turning now to FIG. 2, the major modules of the present invention are shown in a grouping by residency analyzer 100 and treaty analyzer 300.

Figure 3:
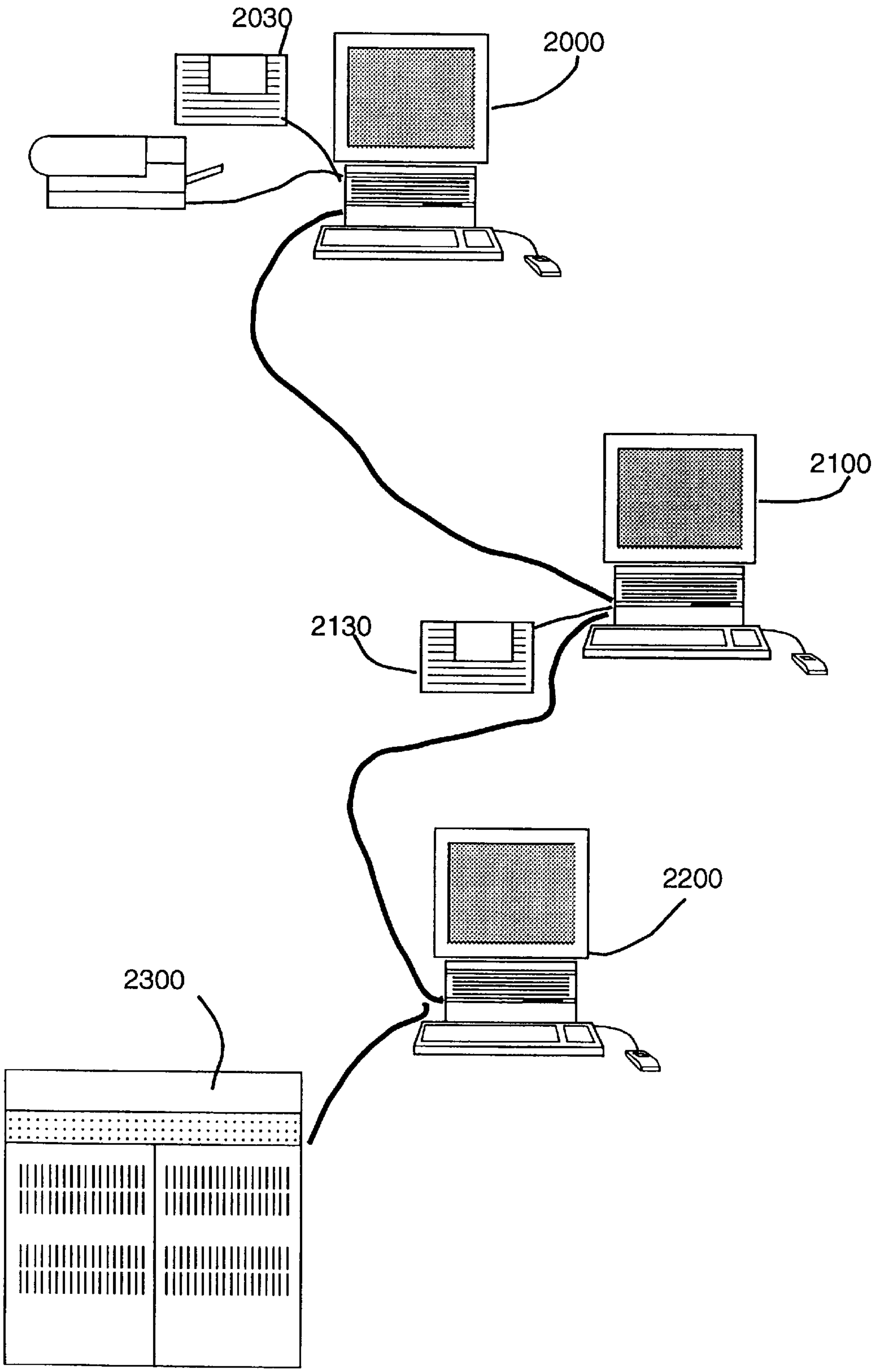
FIG. 3 is a schematic view of the present invention used in a networked environment.

With reference now to FIG. 3, in a preferred embodiment, an IBM-compatible personal computer system, 2000, having a keyboard as a data entry device and an external hard drive 2030, as the external file forms a part of the system of the present invention. As will be apparent to those skilled in the art, other personal computer systems or workstation devices such as MACINTOSH™ systems or SUN SPARCSTATIONS™ could be used, as could mini-computer systems or systems that use client/server technology to make data available to other inexpensive terminals or computers. Mainframe computer systems could be used, as well.

In one preferred embodiment of the present invention, a personal computer system 2000 could be used as a standalone system at a department or institution's site, or by a professional such as an accountant or tax attorney. In another preferred embodiment, several systems, such as personal computers 2000, 2100 and 2200 could be networked together to share information. In academic institutions with a large foreign student, scholar and researcher enrollment, a system could be located at the office of the foreign student advisor, connected to a mainframe 2300 located in the payroll department, and possibly another personal computer 2000 located in the finance department or the office charged with administering scholarships and fellowships. This ability helps the institution as a whole comply with the IRS requirements that such information be shared in such ways with such departments.

The systems shown in FIG. 3 are implemented on Microsoft's Windows operating system for computers using Intel's chips, and in Microsoft Corporation's Visual Basic v. 3.0 programming language and Microsoft's Access database, v. 2.0 and query capabilities, including client/server type support and Standard Query Language (SQL) support. A preferred embodiment has its own query structure for residency and tax treaty analysis. As will be apparent to those skilled in the art, other programming languages can be used, such as C or C++, or others, and other database formats, such as several flat file databases or relational databases and query styles could be used. In a preferred embodiment, Visual Basic was selected for its ease of use and ability to generate structured, self-documenting code. In the same preferred embodiment, the Access database was selected for its graphical displays and its ability to link data and table files. In addition, both Visual Basic and the Access database and the Microsoft Windows operating system were also selected for their ease of use as graphical interfaces. To keep overall system costs for institutions affordable, the easier it is for an individual to learn how to use the system without additional training courses and expense, the better. As will be apparent to those skilled in the art, while tools that provide affordable ease of use in graphical terms were selected for the present invention, as other ergonomically desirable interfaces become available or affordable, they could be substituted. Voice recognition systems, for example, might be substituted. Similarly, if systems constructed according to the method and apparatus of the present invention were to be used in foreign countries, to prepare students, scholars, or researchers for coming to the US, the interfaces could also be modified to reflect the local language and character set.

Still in FIG. 3, it can be noted that use of commonly available programming languages and database structures helps to simplify updating and maintaining the expert knowledge data. Similarly, use of widely available personal computers and workstations helps to keep total system costs affordable for the majority of institutions and professionals who might use the present invention . As will be apparent to those skilled in the art, as other devices, such as personal digital assistants or laptop computers or other products become as powerful, easy to update, and affordable, they could be used, instead.

It will also be apparent to those skilled in the art that portions of the present invention could be used separately or combined with other systems, or both. For example, the residency analyzer could be used independently of most of the tax treaty analyzer, to help foreign students who are thinking of returning to the US as teachers or scholars understand whether limitations have been reached that might negate hoped for benefits. Similarly, the present invention could also be combined with a full tax return preparation system. In addition, the treaty analyzer could be adapted for use in other countries for their tax systems. And the techniques of the residency analyzer could also be adapted for other countries' visa systems. In many respects, the US tax and visa systems are some of the most complicated in the world, so adaptations for simpler systems should be able to be accomplished fairly easily, if desired.

Turning now to FIGS. 4A-1 through 4E, a country table constructed according to the method and apparatus of the present invention is shown. In a preferred embodiment, this table is linked in the Access database with other information to assist the residency analyzer in determining whether or not a treaty has been negotiated with a country named by the foreign national as one where he or she was tax resident recently. Also in a preferred embodiment, this table uses as the country code, the two-letter code designated by the IRS for that country. The full name of the country is included, as is a short-form name, if one exists. Information contained in the country table is also used to supply data to displays and forms for country name and code.

Now turning to FIGS. 6A-1 through 6K-2, a tax treaty table according to the method and apparatus of the present invention is shown. In a preferred embodiment, the table contains the followings shown (with explanations,) in Table 1.

The treaty table contains expert knowledge in a form that has been codified for analysis. To illustrate, in that part of the treaty table shown in FIG. 6A-1, it can be seen that over 40 treaties, which are in effect for over 50 countries are included by country code and name. For each country, one of the first items noted is PRTR, (which is explained in Table 1 as an indicator of whether or not there is a prior treaty in the system.) This indicator helps the system determine whether an individual may be eligible for treaty benefits under the older treaty. Still in FIG. 6A-1, the effective date of the treaty (EDATE) and termination date (TDATE) are included. If a foreign national has been in the US during the time a new treaty was put into effect or at the time one expired, his or her benefits may be affected by this.

With Reference now to Table 1, it can be seen that the treaty table encodes expert knowledge about the following areas:

Residency—is residency defined by the treaty, and if so, in which article, and if there is a residency requirement, is there a tie-breaker rule? The specific article numbers from the applicable treaties are required for many forms. The present invention is also designed to include text from selected treaty articles for display, if the user desires. In the same way, certification forms taken from IRS rulings or created to conform to apparent requirements are stored in text format and referred to within the treaty table as well. These, too, can be displayed or used as the basis for compliance documents created according to the method and apparatus of the present invention.

Taxes Covered—does the treaty cover US FICA/social security and if so, in which article.

Saving Clause—is there a saving clause, what is its article number, does it include residents, does it create exceptions for the treaty's other articles on teachers, researchers and students or Lawful Permanent Residents (LPR's), does its exceptions exclude US citizens?

In FIG. 5*b,* a large number of items of expert knowledge is encoded about teachers and researchers, as indicated, ranging from such points as whether any articles exist for these categories, to such things as whether a school must be accredited or not.

Now in FIG. 5*c,* it can be seen that the treaty table in a preferred embodiment also includes expert knowledge about how each treaty with each country treats students and trainees, the types of scholarships and fellowships covered, and so on. FIGS. 5*d,* 53, 5*f,* and 5*g,* are indicative of the contents of the treaty table of a preferred embodiment of the present invention. As will be apparent to those skilled in the art, the treaty table could be expanded easily to include other treaty articles and provisions that are more likely to be applicable to individuals employed in corporations. For example, many treaties also have provisions about pension plans and similar matters that are more likely to be applicable to foreign nationals working for corporations.

With reference now to FIG. 5A, portions of residency analyzer 100 are described. At step 102, for example, information about the institution is collected by the present invention, and next, at step 104, information about the foreign national is gathered. Specifically, the person's personal data (name, passport number, work activity and so on) as well as foreign addresses and US addresses and income information by calendar year are collected.

At step 106, the residency analyzer 100 gathers detailed information about every visa issued to the FN, including each visa's start and end date, visa type, visa number, the primary activity the person was engaged in while present under that visa, whether the person's income or scholarship/fellowship was foreign funded, where the person has been tax resident and whether he or she has claimed treaty benefits previously. In the example shown, specific reference is made to benefits available as a student or teacher. More information is collected in some cases. Also, in FIGS. 7A through 7G, forms are shown that can be used by an academic institution to collect information about foreign students, scholars and researchers coming to this country. Similarly, as shown in FIGS. 8A through 8H, interactive display screens according to the method and apparatus of the present invention can be used to collect the information for the Access database, and display it.

Returning to FIG. 5A, the residency analyzer is designed to handle a variety of the situations that can arise with respect to certain types of visas, as indicated at step 110. In situation 1, a Q visa is shown being analyzed. If the Q visa starts and ends before Oct. 1, 1994, the date of certain changes in the law, this is indicated. If the change occurred during the time of the visa, situation 2 exists and is handled as shown. If the Q visa was issued after the change in the law occurred, a different indicator is set.

Still in FIG. 5A, note that rules 112 are applied to the visa analysis.

Turning now to FIG. 5B, a more detailed description is given showing how the Q visa situations mention above are handled.

With reference now to FIG. 5C, the main logic of the residency analyzer's exempt days analysis is shown.

Now with reference to FIG. 6D, records about an individual's visa history created according to the method and apparatus of the present invention are shown. In this example, the individual was present in the US on J-1 visa from Aug. 30, 1993 through Jun. 6, 1995. Record 130 was created for the first year that the individual (indicated by ID1) was present on that visa. It is linked to an activity record, 136 for that same year that records what the individual was actually doing that year. It is sometimes the case that the individual is in the US on one type of visa, but he or she is performing work and earning income for activities not contemplated for that visa type or any of the treaty benefits created for it. Thus, primary activity is tracked separately by the present invention.

Still in FIG. 6D, note that a year summary record, 142 is also created for the FN. Such a record is created for each visa that has been issued to the individual.

Residence analyzer 100 uses the information contained in an individual's visa history and activity records to make such detailed determinations as whether the FN was a Lawful Permanent Resident (LPR) at any time during the calendar year under examination, whether the FN was physically present in the US for specified periods during that year, and so on, to conclude whether or not the FN is a nonresident for US Federal Income Tax (FIT) and FICA purposes, or a resident. If the FN is a nonresident, the analysis shown in Flowchart 2, page 1, of Appendix B is done. FN is determined to be a resident for US tax purposes, the system checks to see if the FN is from a country with which the US has negotiated a tax treaty and if so, whether a tie-breaker rule exists, and whether it applies. Note that the system alerts the user who is a foreign national who has been granted lawful permanent residence (LPR) status, that claiming to be a nonresident under a tax treaty can jeopardize LPR status.

For J and Q non-student visa analysis, if the FN has been in the US on one of these visas for 2 or more of the last 6 years, the system checks to see if the person was present in the US on one of those visas for any part of 5 or more of the last 6 years, and if so, determines whether the person meets the substantial presence test.

In the treaty or no benefit compliance analyzers of the present invention the system does the analysis about which withholdings apply. This may be used after it has been determined that the individual comes from a country that has no tax treaty with the US. It can also be used after tax treaty analysis has been done. In the latter case, the individual comes from a treaty country, but is not entitled to claim benefits. His or her record will indicate this is the case, and the compliance analyzer will perform accordingly.

To perform withholding compliance checking for an individual who has been determined to have no treaty applicable or no treaty benefits available, the system determines whether and how to complete a US W-4 form for the individual. The system can complete a W-4 form for the individual to file with the institution so that the appropriate withholding occurs from any payments made by the institution to the individual.

According to the method and apparatus of the present invention, the system reiteratively reads the individual's record, and makes provisional determinations that may be updated in a later analysis. For example, a presumption about the individual is made at the outset by residency analyzer 100 that the person will be treated as a resident alien (RA). This indicator in the individual's records, may be changed later by the treaty analyzer, as it determines that the individual is to be treated as a nonresident alien (NR or NRA) for US withholding and tax purposes. As will be apparent to those skilled in the art, a variety of other ways of implementing the residency analyzer and its presumptions could be used to reach the same results.

Decisions analysis 310 of treaty analyzer 300 analyzes the individual's records by treaty country, income type and primary activity to determine which types of compensation analysis should be done.

The compensation analyzers of treaty analyzer 300 determine by treaty, by income type, and by activity, which, if any, benefits might be available.

Another part of the expert knowledge embedded in the system is the fact that some benefits have limits, and hence, limitation of benefits analysis 1300 is performed. Additionally, since there can also be combined limits on some groups of benefits, a combined limitation analysis 1440 is done.

As will be apparent to those skilled in the art, as other articles and types of treaty benefits are added to the system, these analyses can easily be changed or amended to include new analyzers. In a preferred embodiment of the present invention, it is contemplated that an annual update service will be provided which would include such additions and amendments, not only to cover new types of provisions, but also to incorporate new treaties, new expert interpretations based on tax rulings, and so on.

Exemption analysis for employment and self-employment income is also done.

Next, the logic of the saving clause analysis 1500 and the treaty country residency requirement analysis 1600 can be done.

Those skilled in the art will appreciate that the embodiments described above are illustrative only, and that other systems in the spirit of the teachings herein fall within the scope of the invention. While preferred embodiments of the present invention are embedded in programming language and a relational data base on a computer system, it will also be apparent to those skilled in the art that some or many portions of the present invention could be implemented as gate arrays or custom logic processors for specialized implementations. These and other systems in the spirit of the teachings herein fall within the scope of the invention.

What is claimed is:

1. A computer system for monitoring tax status of a foreign national, comprising:

a processor having memory coupled to it, storing values supplied by the foreign national about visa history, travel, and activity data;

electronic storage media coupled to the processor, the electronic storage media storing a treaty table file containing codified expert knowledge about tax treaties including date specific limitations therein;

a residency analyzer program executing in the processor, which, when executed determines a foreign national's tax residence status by processing the visa history, travel, and activity data stored in memory at least once from the most current such data to the oldest such data and then processing at least once from the oldest such data to the most current such data, creating an indication of its results, including preliminary indications of eligibility for treaty benefits, in a plurality of records stored in memory, including at least one summary record for each year;

a treaty analyzer program executing in the processor, which, when executed iteratively reads said records stored in memory by said residency analyzer program, coupled with said codified expert knowledge from said treaty table file, looking for start and end dates of visa history, travel and activity data in said records stored in memory by said residency analyzer program, while applying to such visa history, travel and activity data any date specific limitations in said treaty table file, determines whether said foreign national is eligible for treaty benefits, updates at least one summary record if this determination differs from said preliminary indication, completes designated forms and electronically communicates said forms outside the computer system.

2. The apparatus of claim 1, wherein the residency analyzer program further comprises:

a data entry means for capturing visa period information about said foreign national's visa history, travel, and activity for each year of a specified number of years;

a calendar converger means for organizing said visa period information into tax calendar years and creating and storing a plurality of records of said foreign national's visa status and activity for each year of a specified number of years, on said electronic storage media so that said residency analyzer program can read and analyze each of said plurality of records by processing first forwards at least once from the most current such data to the oldest such data and then processing backwards at least once from the oldest such data to the most current such data to determine whether applicable residency tests have been met.

3. The apparatus of claim 2, wherein the residency analyzer program reads and analyzes each of said plurality of records first forwards at least once from the most current such data to the oldest such data and then backwards at least once from the oldest such data to the most current such data to see whether a substantial presence residency test has been met during each tax calendar year, by performing exemption analysis to preliminarily determine whether said foreign national was exempt during any part of the visa periods.

4. The Apparatus of claim 1 wherein the treaty analyzer program further comprises a compensation analyzer means to determine the nature of activity data involving income and whether treaty benefits are applicable thereto.

5. The Apparatus of claim 1, wherein the treaty analyzer program further comprises a combined limit analyzer means which re-reads the records stored in memory by the residency analyzer program to see if combined limitations from the tax treaty table file apply to treaty benefits.

6. The Apparatus of claim 1, wherein the treaty analyzer program further comprises a savings clause analysis means which determines whether treaty benefits are available notwithstanding the preliminary indications stored by the residency analyzer program.

7. A computer-implemented method of monitoring tax status of a foreign national comprising the steps of:

storing values supplied by the foreign national about visa history, travel, and activity data in memory coupled to a processor in a computer system;

storing codified expert knowledge about tax treaties including date specific limitations therein in a treaty table file on electronic storage media coupled to the processor;

executing a residency analyzer program in said processor to determine a foreign national's tax residence status by processing the visa history, travel, and activity data stored in memory at least once from the most current such data to the oldest such data and then processing at least once from the oldest such data to the most current such data, to create an indication of results, including preliminary indications of eligibility for treaty benefits, in a plurality of records stored in memory, including at least one summary record for each year;

executing a treaty analyzer program in said processor iteratively reads said records in memory coupled with the codified expert knowledge stored in said treaty table file, looking for start and end dates of visa history, travel and activity data in said records stored in memory by said residency analyzer program, while applying to such visa history, travel and activity data any date specific limitations in said treaty table file, to determine whether said foreign national is eligible for treaty benefits;

updating at least one summary record if the determination in the previous step differs from said preliminary indication of eligibility; completing designated forms; and electronically communicating said designated forms outside the computer system.

8. The method of claim 7, further comprising the steps of:

capturing visa period information about said foreign national's visa history, travel, and activity for each year of a specified number of years;

executing a calendar converger program in said processor for organizing said visa period information into tax calendar years and creating and storing a plurality of records of said foreign national's visa status and activity for each year of a specified number of years on said electronic storage media; and executing said residency analyzer program so that said residency analyzer program can read and analyze each of said plurality of records first forwards at least once from the most current such data to the oldest such data and then backwards at least once from the oldest such data to the most current such data to determine whether applicable residency tests have been met.

9. The method of claim 8, further comprising the steps of:

reading and analyzing each of said plurality of records first forwards at least once from the most current such data to the oldest such data and then backwards at least once from the oldest such data to the most current such data to see whether a substantial presence residency test has been met during each tax calendar year, by performing exemption analysis to preliminarily determine whether said foreign national was exempt during any part of the visa periods.

* * * * *